United States Patent [19]

Shimada

[11] Patent Number: 4,882,746
[45] Date of Patent: Nov. 21, 1989

[54] CORDLESS TELEPHONE SYSTEM

[76] Inventor: Masatoshi Shimada, 6-12, Todoroki-3-chome, Setagaya-ku, Tokyo, Japan

[21] Appl. No.: 169,466

[22] Filed: Mar. 17, 1988

[30] Foreign Application Priority Data

Mar. 22, 1987 [JP] Japan .................................. 62-68772
May 1, 1987 [JP] Japan ................................ 62-106266
May 29, 1987 [JP] Japan ................................ 62-131487
Sep. 7, 1987 [JP] Japan ................................ 62-221839

[51] Int. Cl.$^4$ .......................................... H04M 11/00
[52] U.S. Cl. ........................................ 379/61; 379/63
[58] Field of Search ............................... 379/61, 62, 63

[56] References Cited

U.S. PATENT DOCUMENTS

| 4,500,752 | 2/1985 | Lee | 379/61 |
| 4,508,935 | 4/1985 | Mastromoro | 379/62 |
| 4,640,987 | 2/1987 | Tsukada et al. | 379/62 |
| 4,672,658 | 7/1987 | Kavehrad | 379/63 |
| 4,677,655 | 6/1987 | Hashimoto | 379/61 |
| 4,706,278 | 11/1987 | Baker et al. | 379/61 |

*Primary Examiner*—Robert Lev
*Attorney, Agent, or Firm*—Stevens, Davis, Miller & Mosher

[57] ABSTRACT

A cordless telephone system has a master unit connected to a telephone line and having a radio transceiver and a plurality of sub-units having radio transceivers and transmittable to and receivable from the telephone line through the master unit. Speech from the telephone line can be transferred between any sub-units, and speech by press-to-talk system is enabled between any sub-units through the master unit. A multi-purpose controller is provided in the master unit to enable control of an equipment by dialing from a sub-unit. For example, a tape recorder is operated, an automatic response/record function is operated, an interphone function is operated, a call from the telephone line can be directed to any sub-unit by a signal from the sub-unit, and all sub-units can be simultaneously or sequentially called from the telephone line. In the speech between sub-units by the press-to-talk system, signals representing start and end of the speech are generated by the sub-unit to control holding and release of an external telephone line of a master unit repeater so that speech with the external line is restored immediately after the end of the speech between the sub-units. When one sub-unit is in speech, other sub-units cannot hear the speech.

22 Claims, 20 Drawing Sheets

CORDLESS TELEPHONE SYSTEM

BACKGROUND OF THE INVENTION

The present invention relates to a cordless telephone set, and more particularly to a cordless telephone system in which a master unit is provided with various control functions which are controllable by at least one of a plurality of sub-units, any sub-unit can be called from an external commercial telephone line, transfer between sub-units is permitted and speech between sub-units is permitted through the master unit.

It is an object of the present invention to provide a new and improved cordless telephone set and application apparatus thereof based on the following problems (1)–(5) encountered in the conventional cordless telephone set.

(1) In a conventional cordless telephone set, one sub-unit is used for one master unit. Accordingly, if a person who carries the sub-unit is present at a pool side, bath room or rest room, it is troublesome to tell him/her that he/she is having a telephone call, and in some case it is difficult to tell him/her. In one aspect of the present invention, a plurality of sub-units are associated with the master unit and means for transferring the telephone call to another sub-unit is provided. When there is no speech with an external telephone, communication and speech between sub-units are permitted to efficiently use the telephone set.

In the case of using one master unit in common for a plurality of sub-units in a conventional set, it is impossible for the sub-units to have mutual communication between any two sub-units since they are designed to use a transmitted signal and a received signal of the same frequency.

The present invention makes possible a mutual communication between any two sub-units by way of a master unit. When any one sub-unit A transmits a speech signal, which is received by and transmitted from the master unit, another sub-unit B can receive a transmitted speech signal from the master unit. In such a communication, if the sub-unit B transmits a signal wave, it will interfere with the signal wave transmitted from the sub-unit A to disturb and prevent the signal reception of the master unit. In order to avoid this drawback, the sub-unit B is inhibited from transmitting its own speech signal when receiving from another sub-unit through the master unit. Thus any two sub-units A and B can conveniently communicate with each other using a press-talk system.

(2) In non-speech mode, the master unit and dialing signal senders of the sub-units are idle. Accordingly, by providing various control functions in the master unit and controlling them by various signals generated by complex combinations of dial digits of the sub-unit, the telephone set may be rendered to function as an automatic responding and recording telephone set, the sub-unit may be permitted to reproduce the speech done during absence, a light may be turned on and off or a garage door may be opened and closed so that the cordless telephone set is more effectively used. Since all of the functions of the master unit can be controlled by the sub-units, the master unit may be placed at a high position not accessible by human being so that a range of reach of its electromagnetic wave is expanded. If it is housed in a locker, a mounting space can be saved and trouble by a cord is also eliminated.

(3) A conventional cordless telephone system has also been arranged such that the master-unit is internally provided with an intercom device and the cordless telephone could be manually switched to operate as an intercom device. According to one aspect of the present invention, the master unit can be controlled by a signal from any one sub-unit to relay the sub-unit and an intercom device away from the master unit. Thus, the sub-unit and the intercom device can communicate with each other through the master unit. Also, in the prior art intercom set, when an attendant hears a calling tone, he/she goes to a place of the master unit and can communicate by a press-to-talk method. Accordingly, if he/she cannot go to the place of master unit because, for example, he/she is taking a bath or in a rest room, he/she cannot respond to the call. If he/she is at a distant place that he/she cannot hear the calling tone, he/she cannot therefore respond. Such trouble also occurs in a commercial telephone set and it is the cordless telephone set that has been invented to solve this problem. Namely, if he/she always carries a sub-unit, he/she can hear the calling tone wherever he/she is and he/she can respond immediately. If the external telephone set can be replaced by the intercom set, the disadvantage encountered in the conventional intercom set can be eliminated as is done for the disadvantage of the cordless telephone set. (4) In a cordless telephone set having one master unit and a plurality of sub-units, if the sub-units and master unit have press-to-talk functions, communication between sub-units is permitted through the master unit, as explained above. However, this system has the following problem. It is necessary that a transceiver and the master unit are continuously in operation during the speech between sub-units When the speech terminates, the initial state must be immediately restored in order to prevent trouble in the speech with an ordinary external telephone line. When an external line is to be transferred from a sub-unit A to a sub-unit B, the external line must be kept on hold while the speech and exchange are done between the sub-units. Further, speech between the sub-unit and the external line must be permitted immediately after the termination of communication between the sub-units. In order to immediately reset the master unit at the end of speech between the sub-units, the simplest approach is to use an electromagnetic wave emitted from the sub-unit. However, if the transmitted wave between the sub-units ceases for a long period, a timer circuit is reset and the hold of the external line is released and the speech is interrupted. If a time constant of the timer circuit is set too long, it operates for a long time after the end of speech and this may cause various problems. As shown herein later in FIGS. 6 and 7, in a system which issues a stop signal then, an additional encoder and decoder are needed and price is higher accordingly. Further, the sub-unit is of large size.

In other aspect of the present invention, when the sub-unit B is switched from the press-to-talk mode to a normal speech mode, a predetermined signal is automatically sent out for a very short period so that the timer circuit of the master unit is reset by that signal. A circuit for sending a signal at the start of speech may be used as it is as a circuit for transmitting and receiving the predetermined signal at the end of speech in order to prevent increases of the system cost and size.

(5) In the conventional cordless telephone set, there are two operation modes, stand-by and speech. In the stand-by mode, only a calling tone is reproduced by a speaker and no speech tone is reproduced. In the speech mode, since an electromagnetic wave is emitted, the operation of another unit can be checked and not be used. Accordingly, there is no risk that the speech tone is intercepted. However, in the system in which a plurality of sub-units are associated with the master unit, speech between the sub-units is permitted through the master unit in the press-to-talk system. Accordingly, if the switch is thrown to the press-to-talk mode, the transmission tone between other units can be readily intercepted and such an interception may not be detected by other unit because no electromagnetic wave is emitted in such a mode.

In other aspect of the present invention, the above disadvantage is eliminated by rendering receivers of other sub-units nonoperative while one sub-unit is in speech.

SUMMARY OF THE INVENTION

In order to achieve various objects as described in the foregoing, according to one aspect of the present invention, there is provided a cordless telephone system comprising a master unit connected to a telephone line and having a radio transceiver, at least one sub-unit having a radio transceiver and capable of transmitting and receiving speech to and from the telephone line through the master unit, and means for sending a control signal from the master unit to a unit other than the telephone line by activating the controller of the master unit by a signal from the sub-unit.

In order to achieve the objects described in the items (1) and (2) above, in accordance with another aspect of the present invention, there is provided a cordless telephone system comprising a master unit connected to a telephone line and having a radio transceiver, at least one sub-unit having a radio transceiver and capable of transmitting and receiving speech to and from the telephone line through the master unit, and control means responsive to a control signal from any sub-unit, including at least one of transfer control means for permitting transfer of speech from an external line between sub-units, speech control means for permitting speech between sub-units through the master unit, and equipment control means for controlling an equipment other than the telephone line connected from any sub-unit through the master unit.

In order to achieve the object described in the item (3) above, in accordance with another aspect of the present invention, there is provided a cordless telephone system with an intercom function comprising a master unit connected to a telephone line and having a radio transceiver, at least one sub-unit having a radio transceiver and capable of transmitting and receiving speech to and from the telephone line, at least one intercom unit connected to the master unit, control means for controlling the intercom unit, and means for transmitting a signal between the sub-unit and the intercom unit through the master unit by controlling the control means from the sub-unit.

In order to achieve the object described in the item (4) above, in accordance with another aspect of the present invention, there is provided a cordless telephone system comprising a master unit connected to a telephone line and having a radio transceiver, a plurality of sub-units each having a radio transceiver and capable of transmitting and receiving speech to and from the telephone line through the master unit to permit speech in a press-to-talk system between any two of the sub-units through the master unit, and means for resetting a timer function of a timer unit which holds the master unit in a speech mode, by a predetermined signal sent from any one of the sub-units.

In order to achieve the object described in the item (5) above, in accordance with another aspect of the present invention, there is provided a cordless telephone system comprising a master unit connected to a telephone line and having a radio transceiver, a plurality of sub-units each having a radio transceiver and capable of transmitting and receiving speech to and from the telephone line through the master unit, the sub-unit having a means for permitting the reception of speech by a predetermined signal from the master unit or the sub-unit, the sub-unit having a means for inhibiting the reception of speech by an output of a received electromagnetic wave, the sub-unit having a means for permitting the reception of speech by a speech switch or a press-to-talk switch whereby interception of the speech of one sub-unit by other such unit is prevented.

DESCRIPTION OF THE PREFERRED EMBODIMENTS

Figure 1:
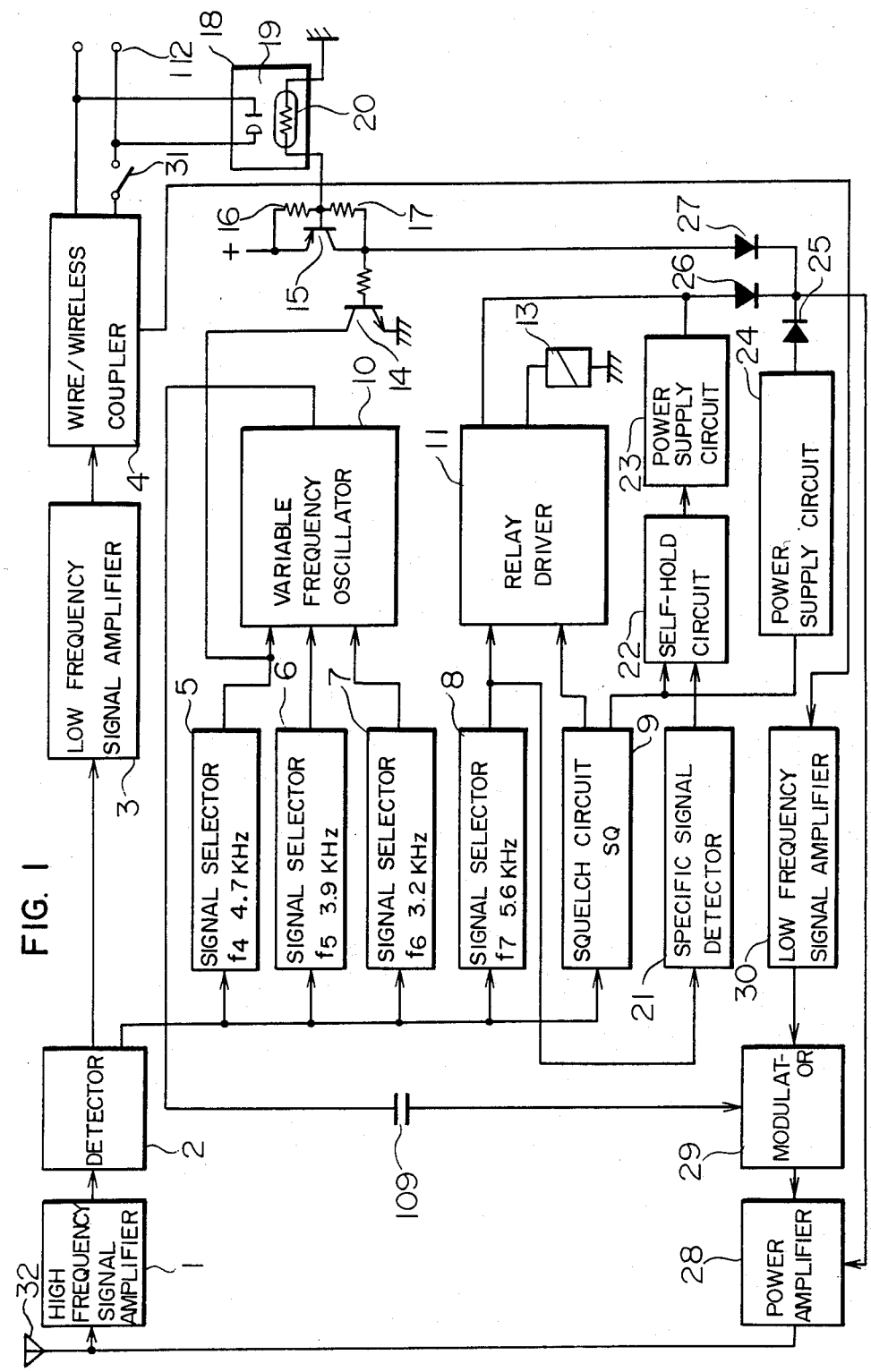
FIG. 1 shows a connection diagram of a first embodiment of a master unit of a cordless telephone system of the present invention.

FIG. 1 shows a connection diagram of a master unit, with a power supply circuit being omitted because it is similar to a known one. Numeral 32 denotes a transmission/reception antenna, numeral 1 denotes an RF amplifier of a receiver, numeral 2 denotes a detector, numeral 3 denotes a low frequency amplifier, numeral 4 denotes a wire/wireless coupler, numeral 112 denotes a connection terminal to a commercial telephone line, numeral 31 denotes a contact of a relay 13 for connecting and disconnecting the telephone line, numerals 5, 6, 7 and 8 denote signal selectors which may be known narrow band width filters or phase detectors or pulse detectors and which produce outputs in response to only predetermined signals, respectively, and numeral 10 denotes a variable frequency oscillator which oscillates at a frequency $f_1$ (for example, 600 Hz) when an output circuit thereof is shorted or a collector circuit of a transistor 14 is shorted to supply the oscillation output to a modulator 29 of a transmitter, and oscillates at a frequency $f_2$ (800 Hz) when the signal selector 6 is actuated and oscillates at a frequency $f_3$ (1200 Hz) when the signal selector 7 is actuated to supply the oscillation outputs to the modulator 29, respectively. Numeral 18 denotes a detector for a call signal from the telephone line 112, numeral 19 denotes a discharger which is activated in response to a high voltage call signal, numeral 20 denotes a resistor having a resistance thereof changed in accordance with a discharge light of the discharger, and numeral 15 denotes a transistor whose collector potential is changed in accordance with the change of resistance of the resistor 20 to open or close the collector circuit of the transistor 14. Numeral 11 denotes a driver for the relay 13. When an output of a squelch circuit 9 is positive, the relay 13 is actuated to close a contact circuit 31, and when the signal selector 8 is activated, the relay is reset to open the contact circuit 31. It permits dialing similar to that of a telephone set. Numeral 22 denotes a self-hold circuit which starts the hold operation when a short period output of a specific signal detector 21 and an output of the squelch circuit 9 are coincidentally applied thereto, holds the signal even after the output of the detector 21 has been terminated, and releases the signal when the output of the squelch circuit 9 extinguishes. Numeral 23 denotes a power supply circuit which supplies a power during the operation of the self-hold circuit 22, and numeral 24 denotes a power supply circuit which supplies a power when the squelch circuit 9 alone operates. They serve to supply the power in the speech between the sub-units by a press-to-talk system without regard to the telephone line.

Figure 2:
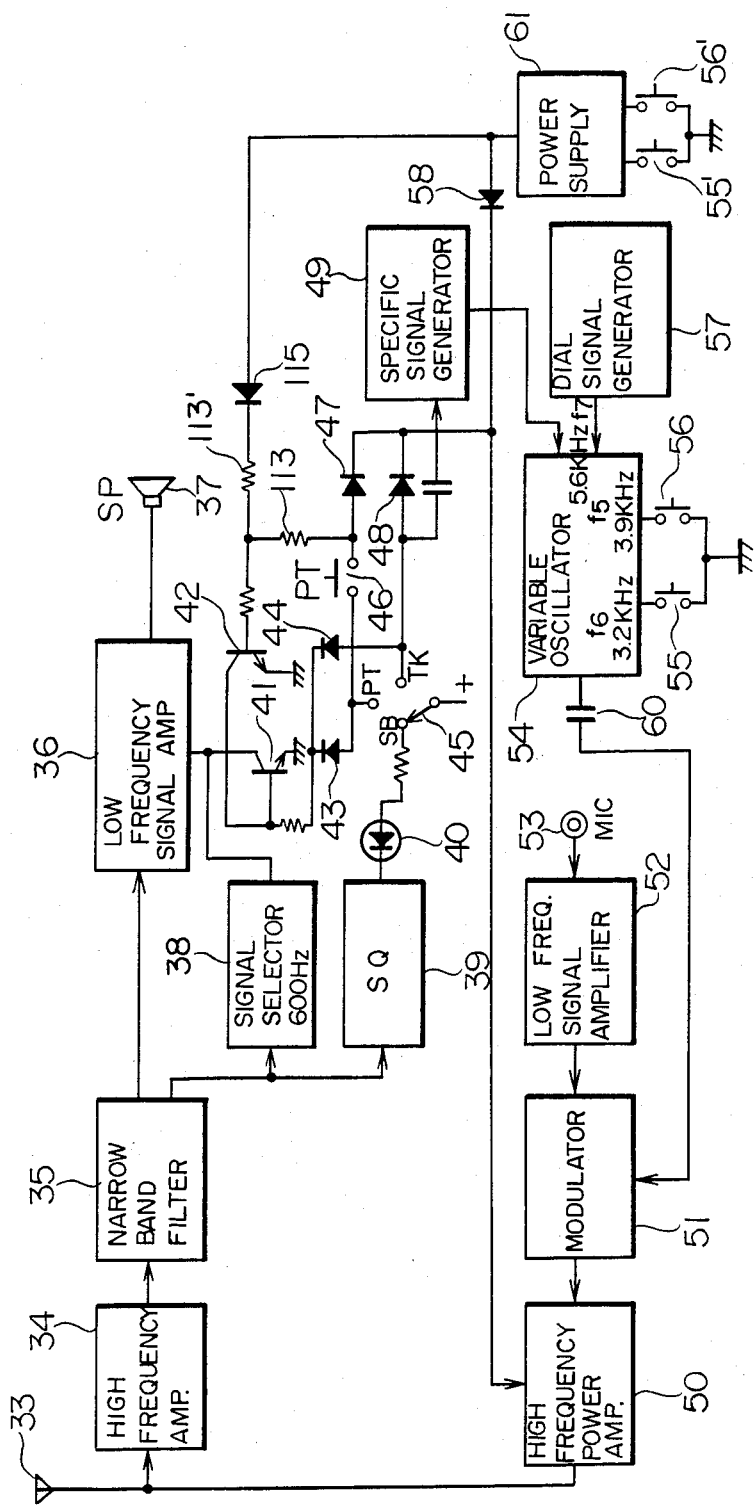
FIG. 2 shows a connection diagram of an embodiment of a sub-unit for the master unit.

FIG. 2 shows a connection diagram of a sub-unit. Numeral 33 denotes a transmission/reception antenna, numeral 34 denotes an RF amplifier of a receiver, numeral 35 denotes a detector, numeral 36 denotes a low frequency amplifier, numeral 37 denotes a speaker of a handset, numeral 38 denotes a frequency selector such as a known narrow band filter or phase detector or pulse detector, numeral 41 denotes a transistor switch which opens or closes the amplifier 36 in response to the output of the frequency selector 38, numeral 45 denotes a switch for selecting one of three modes, stand-by (SB), press-to-talk (PT) and talk (TK), numerals 43 and 44 denote diodes which control the transistor 41 to activate the low frequency amplifier 36, numeral 46 denotes a push-button switch for the press-to-talk speech, numeral 49 denotes a specific signal generator which is activated by a click generated upon power-on by a switch 45, produces a specific signal for a short period to activate the control circuit starting from the specific signal detector, as shown in FIG. 1, numeral 57 denotes a dialing signal generator which generates the same number of pulse signals as a digit marked on a button as a conventional push-button telephone set does to control a variable frequency oscillator 54 to start and stop the oscillation at a frequency corresponding to the frequency selector 8 of FIG. 1, numerals 55, 55', 56 and 56' denote push-button switches for calling sub-units C and B, with numeral 61 power supply, numeral 53 denotes a microphone for transmitting speech, numeral 52 denotes a low frequency amplifier, numeral 51 denotes a modulator and numeral 50 denotes an RF power amplifier. In FIG. 1, when a call signal appears on the telephone line 112, the resistance of the resistor 20 changes in accordance with the signal and base voltages of the transistor 15 and 14 change accordingly so that the collector circuits thereof are opened or closed in accordance with the signal. The variable frequency oscillator 10 repeatedly starts and stops the oscillation at a predetermined frequency $f_1$ (600 Hz) in accordance with the signal and the oscillation output is supplied to the modulator 29. On the other hand, a current flowing through the transistor 15 flows through the diode 27 and is supplied to the power amplifier 28. Thus, an electromagnetic wave modulated by the call signal is supplied to the antenna. In a sub-unit, for example, the sub-unit A in FIG. 2, the switch 45 is normally at the position SB (stand-by) so that no voltage is applied to the base of the transistor 41 and the low frequency amplifier 36 is opened and no signal tone is reproduced by the speaker. If a signal electromagnetic wave described in connection with FIG. 1 is received, it passes through the RF amplifier 34 and is detected by the detector 35, and a calling signal tone which is an on-off tone at 600 Hz is applied to the filter 38. The filter 38 has the output terminal thereof shorted only when a predetermined signal is applied thereto. The amplifier 36 is activated in response to the call signal and the call signal applied to the input of the detector is amplified to drive the speaker to inform one of the call from the telephone line. In the called sub-unit A, the switch 45 is thrown to the talk (TK) position. Thus, the power is supplied to the base of the transistor 41 through the diode 44 to short the collector circuit of the transistor 41 so that the low frequency amplifier 36 is activated. The power is also supplied to the power amplifier 50 through the diode 48 so that the transmission electromagnetic wave is emitted. The specific signal generator 49 is activated by the click generated when the switch 45 is thrown to the position TK, and the output thereof causes the variable frequency oscillator to start and stop the oscillation in accordance with the signal. This signal is also emitted as the electromagnetic wave as described above. When this electromagnetic wave is received in FIG. 1, the specific signal emitted from the sub-unit A (usually f7 and for the purpose of explanation, 5.6 KHz) is demodulated to activate the specific signal detector 21. Only when the output of the specific signal detector 21 and the output of the squelch circuit (SQ) 9 which is activated when the received electromagnetic wave is present are coincident, the self-hold circuit 22 and the power supply circuit 23 are activated and the output current flows through the diode 26 to the transmitter 28 which emits the electromagnetic wave. After the self-hold circuit has been activated, it holds the signal even after the output of the specific signal detector 21 has ceased and it is reset after the received electromagnetic wave has extinguished and the output of the squelch circuit 9 has ceased, to stop the supply of power. As described above, since the master unit and the sub-units are now in operation, the sub-unit can transmit and receive speech by the microphone 53 and the speaker 37 as a conventional telephone set does. The transmission frequencies of the master unit and the sub-units must be selected to be non-interference frequencies. When it is found that the sub-unit who responded to the call from the telephone line is not the sub-unit A but the sub-unit B, the gang switch 56, 56' for calling the sub-unit B is depressed in the sub-unit A of FIG. 2. Thus, the variable frequency oscillator 54 oscillates at 3.9 KHz (in general at f$_5$) by the depression of the switch 56 and it is carried by the electromagnetic wave to actuate the signal selector 5 of FIG. 1. The variable frequency oscillator 10 thus oscillates at 800 Hz which is carried by the electromagnetic wave of the master unit. In the sub-unit B, only the frequency of the frequency selector 38 in FIG. 2 is different, that is, it is at 800 Hz but the rest is same as that of FIG. 2. Thus, the low frequency amplifier 36 is activated to reproduce the 800 Hz calling tone. When the switch 45 is thrown to the speech position, speech can be made by the sub-unit B. In the above operation, in the sub-unit A, the electromagnetic wave emitted by the master unit is received by the receiver of the sub-unit A and the received tone is picked up by the microphone of the sub-unit A, resulting in howling. The diodes 115 and the transistor 42 of FIG. 2 serve to eliminate the above trouble by grounding the base voltage of the transistor 41 to stop the operation of the amplifier 36 when the power supply is activated to start the transmission.

When any telephone set is to be called from the sub-unit A through the commercial telephone line, the switch 45 is thrown to the talk (TK) position and buttons of the dialing signal generator 57 arranged in the same manner as those of a conventional push-button telephone set are depressed in accordance with the telephone number to be called so that pulse signals are generated in accordance with the telephone number. The variable frequency oscillator 54 starts and stops the oscillation at 5.6 KHz (f7) in accordance with the pulse signals and the oscillation output is carried by the electromagnetic wave. When the master unit shown in FIG. 1 detects it, it passes through the signal selector 8 to activate the driver 11 so that the relay 13 and its switching circuit 1 is opened or closed and the dialing signal is sent out to the line. In this manner, the desired unit can be called in the same manner as that in the conventional telephone. When the sub-unit A is to call the sub-unit B to make speech while there is no call from the commercial telephone line, the switch 45 is thrown to the press-to-talk (PT) position and the call switches 56 and 56' are depressed to call the sub-unit B. Since the power is supplied to the transistor 41 through the diode 43, the low frequency amplifier 36 is in operation and the response from the called unit can be reproduced by the speaker 37. When speech is to be sent from the sub-unit A, the press-to-talk switch 45 is depressed so that the power is supplied to the transmitter through the diode 47 and the speech can be sent through the microphone 53. If the sub-units A and B are simultaneously in the transmission mode, the receiver of the master unit would receive two electromagnetic waves simultaneously and this would cause trouble. Accordingly, the press-to-talk system is used so that the transmitter is in operation only when the speech is to be sent. The speech tone of the sub-unit passes through the receiver of the master unit and is transmitted from the transmitter. If it is again received by the receiver of the sub-unit, it would cause a trouble. Accordingly, when the sub-unit sends the speech, its receiver is rendered inoperative. The transistor circuit 42 is provided for this purpose. By grounding the base of the transistor 41 by the speech sending power supply, the low frequency amplifier 36 is opened. If the sub-unit B is busy when the sub-unit A calls the sub-unit B to make speech, the speech would be disturbed if an electromagnetic wave is emitted The squelch circuit 39 and the light emitting diode 40 are provided to prevent such a circumstance. If one of the sub-units is busy through the master unit, the electromagnetic wave is always emitted from the master unit and the squelch circuit 39 is in operation. When the squelch circuit 39 is in operation, the light emitting diode 40 is fired so that the busy state of the line is indicated.

Figure 3:
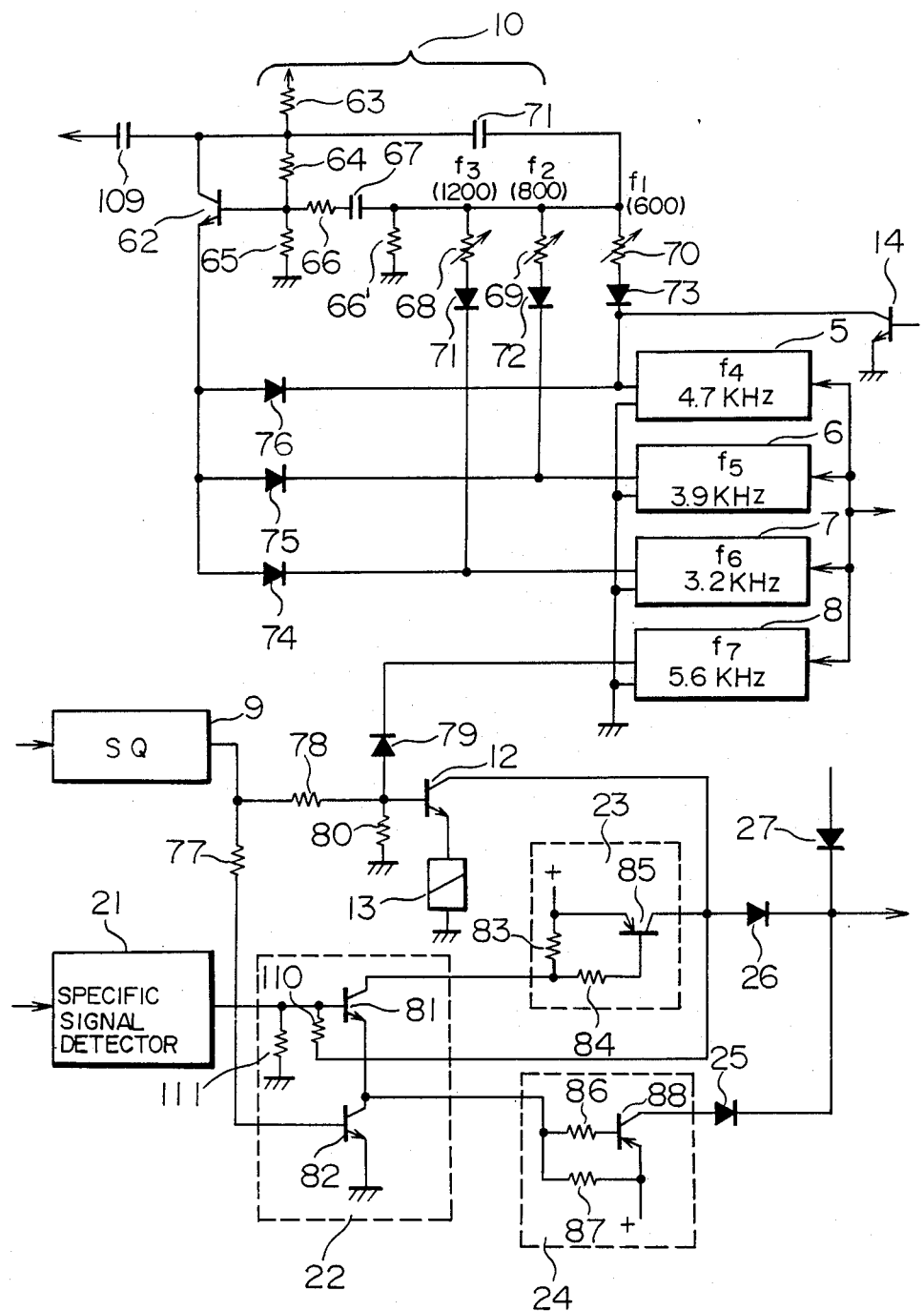
FIG. 3 shows a specific circuit of major blocks of the embodiment shown in FIG. 1.

FIG. 3 shows a specific control circuit for the variable frequency oscillator 10, relay driver 11, self-hold circuit 22 and power supply 22 shown in FIG. 1. A transistor 62 and resistors 64, 65, 66 and 66', capacitors 67 and 67' and potentiometers 68, 69 and 70 connected across the collector and the base of the transistor 62 constitute the oscillator 10. When the collector circuit of the transistor 14 is shorted, the potentiometer 70 is grounded through the diode 73, and the emitter of the transistor 62 is grounded through the diode 76. Thus, the circuit oscillates and the oscillation frequency is adjustable by the potentiometer 70. In the illustrated embodiment, it oscillates at 600 Hz. When a signal of 4.7 KHz is received, the output terminal of the signal selector 5 is grounded and the oscillator again oscillates at 600 Hz. When a signal of 3.9 KHz is received, the oscillator oscillates at 800 Hz, and when a signal of 3.2 KHz is received, the oscillator oscillates at 1200 Hz. When a signal of 5.6 KHz is received, the base of the transistor 12 is grounded through the diode 19 so that the relay 13 is reset and the contact circuit 31 thereof is opened.

When the signal of 5.6 KHz is not received, the relay 13 is actuated by the + input of the squelch circuit 9 and the power supply. The + output of the squelch circuit 9 is applied to the base of the transistor 82 so that the collector thereof is kept shorted. Under this condition, if a + signal appears at the output of the specific signal detector 21, a collector current flows through the transistor 81 so that a base potential of the transistor 85 becomes negative relative to an emitter potential. Thus, a collector current flows through the transistor 85 and it is supplied to the transmitter 28 and also to the base of the transistor 81 through the resistor 110. Thus, the power supply 85 is in operation even after the output of the detector 21 has ceased, and it stops the operation when the electromagnetic wave ceases, the + output of the squelch circuit 9 ceases and the transistor 82 is opened.

Figure 4:
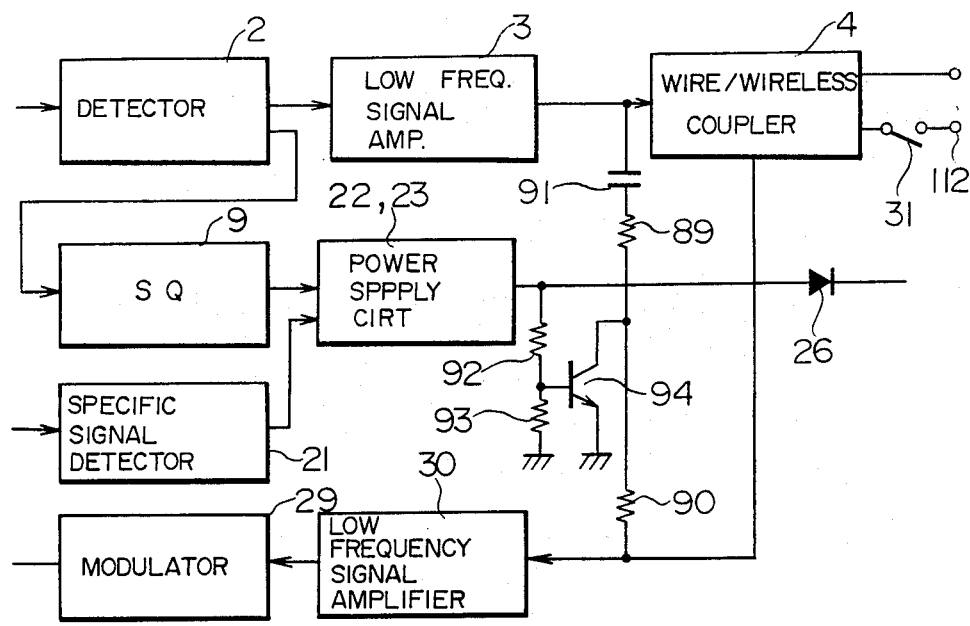
FIG. 4 shows an auxiliary circuit for controlling a signal of a transceiver of the master unit in press-to-talk speech between the sub-units.

As described above, if the switch 45 is thrown to the press-to-talk (PT) position in the sub-unit of FIG. 2 and the press-to-talk switch 46 is depressed, the specific signal is not sent out but only the electromagnetic wave is emitted. Thus, as shown in FIG. 3, the output appears only in the squelch circuit 9 in the master unit, and only the power supply 24 is activated to activate the transmitter. Thus, the transmitter of the master unit is controlled by the open/close state of the press-to-talk switch 46 of the sub-unit, and the speech between the sub-units is attained in the press-to-talk system through the master unit. In this case, a signal or speech received by the receiver of the master unit must be transmitted to the low frequency amplifier of the transmitter as it is. Since the relay is not actuated, the telephone line is opened by the contact 31. Namely, a secondary circuit of the wire/wireless coupler 4 has no load and matching is not attained. As a result, most portions of the output of the receiver flow into the input of the transmitter. If a volume to the transmitter is insufficient, an auxiliary circuit shown in FIG. 4 may be used. FIG. 4 shows only a portion of FIG. 1 and the like numerals to those of FIG. 1 are used. Since the output terminal of the low frequency amplifier 3 and the input terminal of the low frequency amplifier 30 of the transmitter are coupled through capacitor 91 and resistors 89 and 90, the volume from the receiver to the transmitter can be freely selected. In the speech with the conventional telephone line, the specific signal detector 21, self-hold circuit 22 and power supply 23 are activated and the resistors 89 and 90 are shorted by the collector circuit of the transistor 94. As a result, the received sound does not go into the transmitter to disturb the speech. In the speech between the sub-units, the power is supplied from the separate circuit as shown in FIG. 1 and hence the transistor 94 is not activated.

Figure 5:
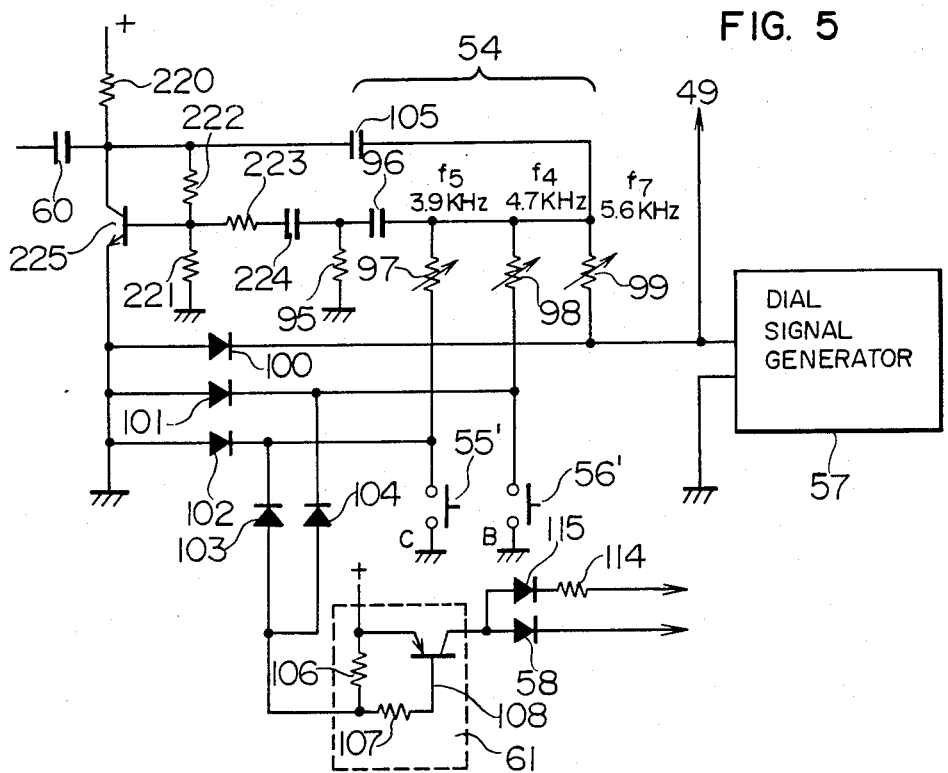
FIG. 5 shows a specific circuit of a variable frequency oscillator used in FIG. 2.

FIG. 5 shows a specific embodiment of the variable frequency oscillator 54 shown by the block in FIG. 2. A transistor 225, resistors 220-223 and capacitors 96, 224 and 105 constitute the oscillator. Potentiometers 97, 98 and 99 are provided to adjust the oscillation frequencies $f_5$ (e.g. 3.9 KHz), $f_4$ (4.7 KHz) and f (5.6 KHz), respectively. When a switch 56 is closed to call the sub-unit B, the emitter of the transistor 225 and the potentiometer 98 are grounded by the diode 101 and the variable frequency oscillator 54 oscillates at 4.7 KHz. The base of the transistor of the power supply 61 is grounded by the diode 104 and a current flows into a collector circuit of the transistor 108. The subsequent operation is same as that of FIG. 2. The operation is same when the dialing signal generator 57 is activated and the output terminal thereof is grounded. In this case, since the output terminal of the generator 57 is repeatedly grounded and opened in accordance with the signal, the 5.6 KHz oscillation is switched on and off accordingly.

Figure 6:
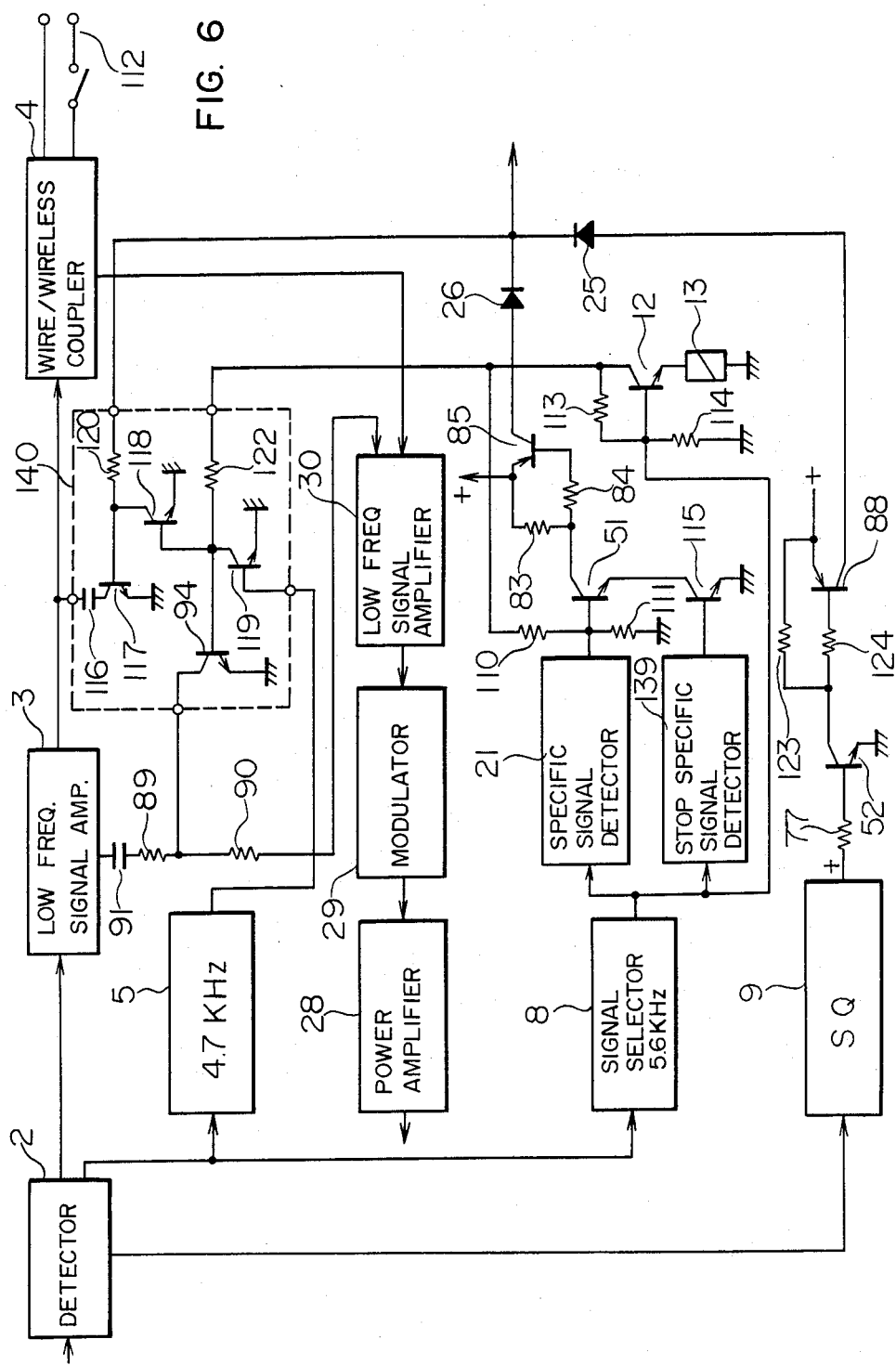
FIG. 6 shows a connection diagram of a second embodiment of a simplified master unit which is a modification of FIG. 1.

In the embodiment of the present invention shown in FIG. 1, only when the specific signal is sent from the sub-unit, the power supply of the master unit is activated and the master unit is connected to the external telephone line in order to prevent the speech from being intercepted by others. To this end, after the master unit has received the specific signal and the power supply 23 has been activated, the supply of the power is continued until the output of the squelch circuit ceases. In this system, however, if the electromagnetic wave is interrupted for a short period by some reason, the power supply is deactivated and will not activated until the specific signal is again received. FIG. 6 shows other embodiment of the present invention which overcomes the above problem. In the present embodiment, a specific signal for stop is sent at the end of speech.

In FIG. 6, numeral 139 denotes a stop specific signal detector. An output thereof is normally positive (+) to short the collector circuit of the transistor so that it does not affect to the operations of the self-hold circuit and the power supply. When the end signal is received, the positive output of the detector 139 extinguishes and the transistor 115 is opened so that the self-hold operation is reset.

In FIG. 1, when the sub-unit A sends the 3.9 KHz signal, the master unit converts it to 800 Hz to call the sub-unit B. In FIG. 6, instead of the two-step control of FIG. 1, the 800 Hz call signal is sent from the sub-unit so that the sub-unit is simplified. In the master unit, the received 800 Hz signal is supplied to the amplifier 30 of the transmitter through the capacitor 91 and the resistors 89 and 90. The control circuit comprising the transistors 94, 117, 118 and 119 opens the transistor 94 and shorts the transistor 117 in the call between the sub-units and shorts the transistor 94 and opens the transistor 117 in the normal speech in order to prevent the speech from being disturbed. The signal selector (for example, 4.7 KHz signal selector) detects the 4.7 KHz signal sent together with the 800 Hz call signal to cause the above open/close operation.

Figure 7:
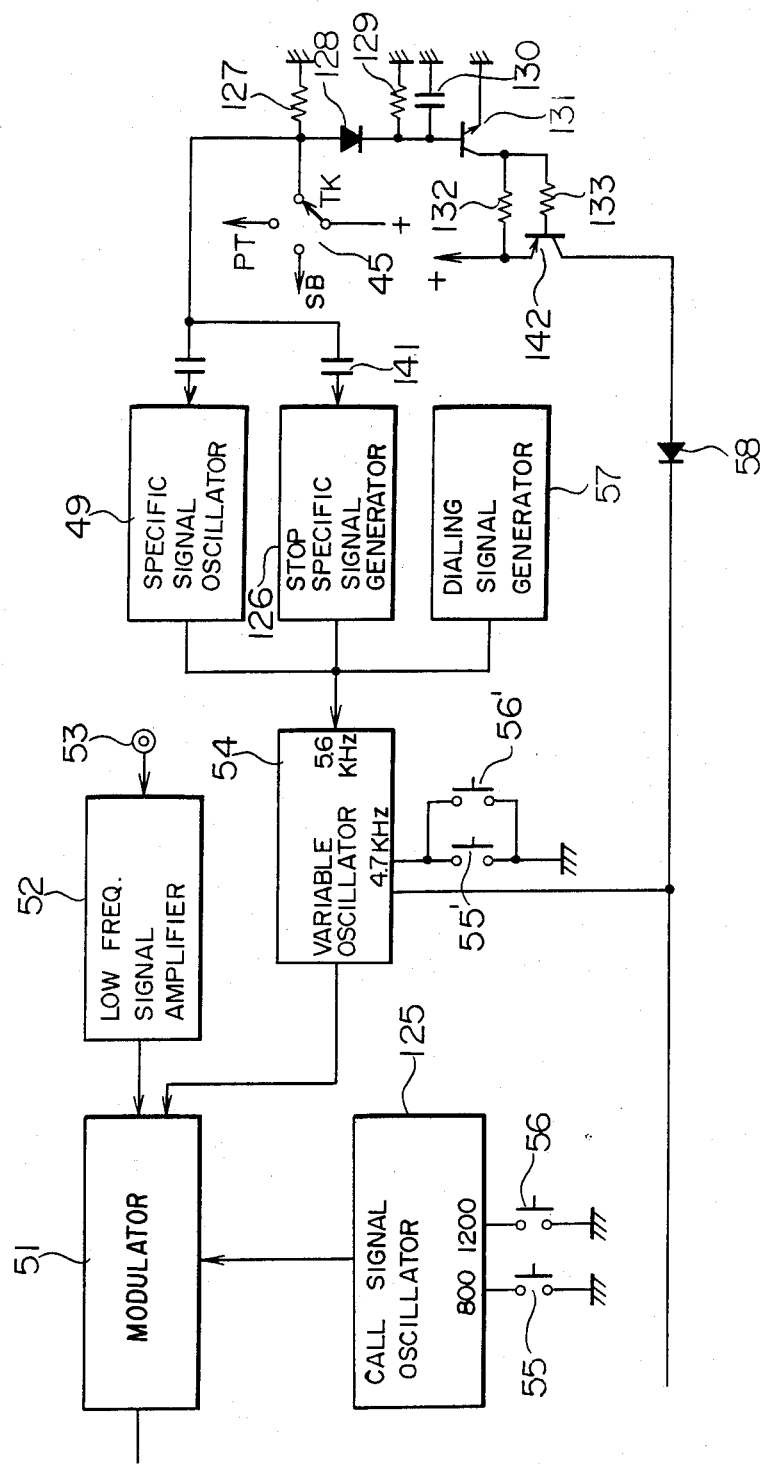
FIG. 7 shows a connection diagram of an embodiment of the sub-unit for the master unit of FIG. 6, FIGS. 8 and 9 show partial connection diagrams of a third embodiment of a further simplified master unit and a sub-unit therefor, in which generation and detection circuits for a predetermined signal indicating the end of speech are omitted from the embodiments of FIGS. 6 and 7.

FIG. 7 shows a circuit of the sub-unit corresponding to FIG. 6. A specific signal generator 49 which generates a specific signal at the start of speech is identical to that shown in FIG. 1. Numeral 126 denotes a stop specific signal generator which generates a stop specific signal at the end of speech. It is activated by a reverse current produced in a capacitor when the switch 45 is thrown to the stand-by (SB) position, that is, when the power is turned off. Accordingly, it is necessary that the transmitter continues to operate for a short period after the turn-off of the power. To this end, a delay circuit of FIG. 7 which comprises resistors 129 and 130, a transistor 131 and a diode 128 is provided. After the power is turned off by the switch 45, the transistors 131 and 142 continue to operate for the short period by the discharge of the capacitor 130, and the power is supplied through the diode 58 and the stop specific signal is sent to the master unit during this period. Oscillators 54 and 125 and other circuits as well as the operations thereof are similar to those shown in FIGS. 2, 3 and 5 and hence the explanation thereof is omitted.

Figure 8:
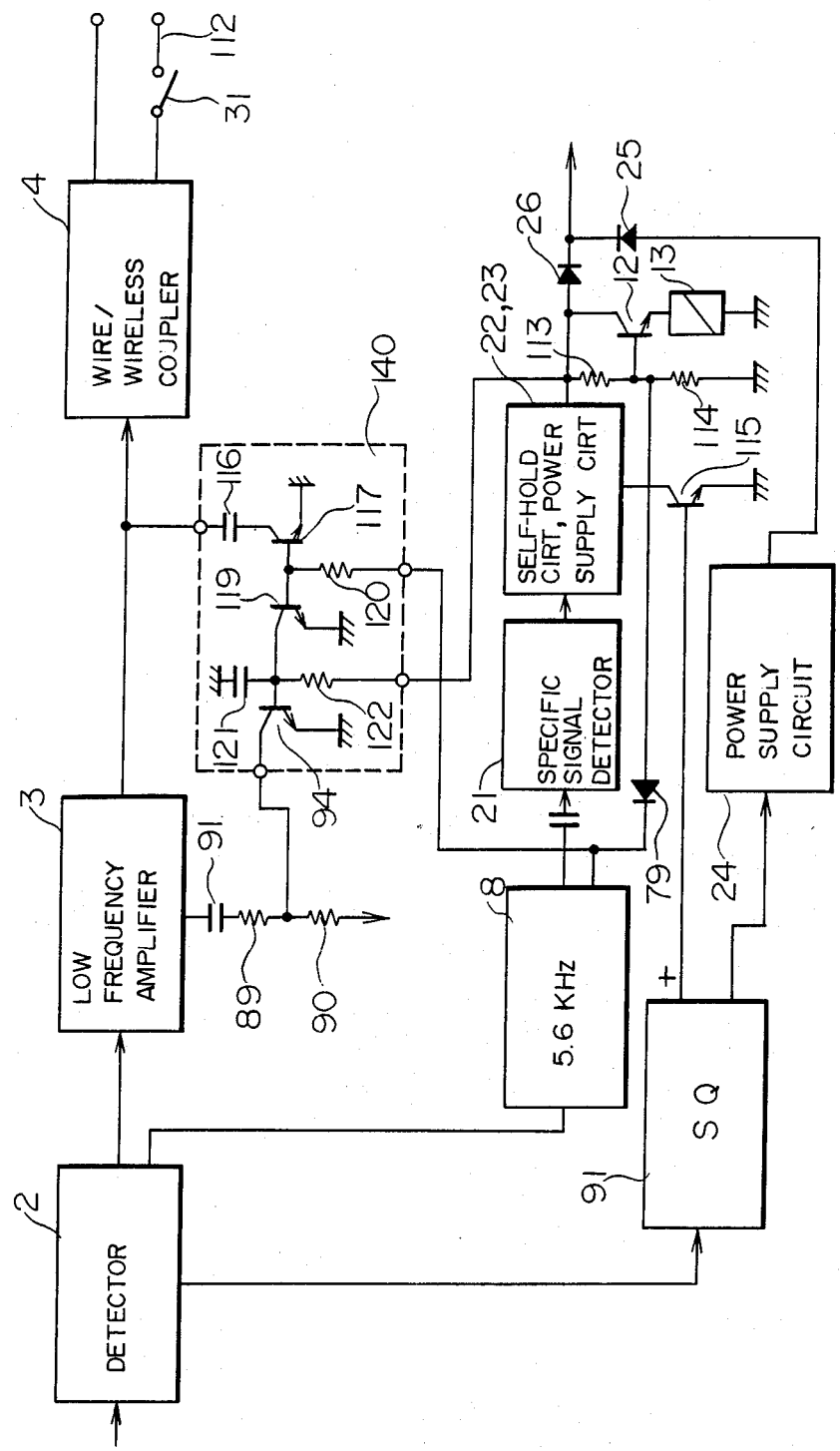
Figure 9:
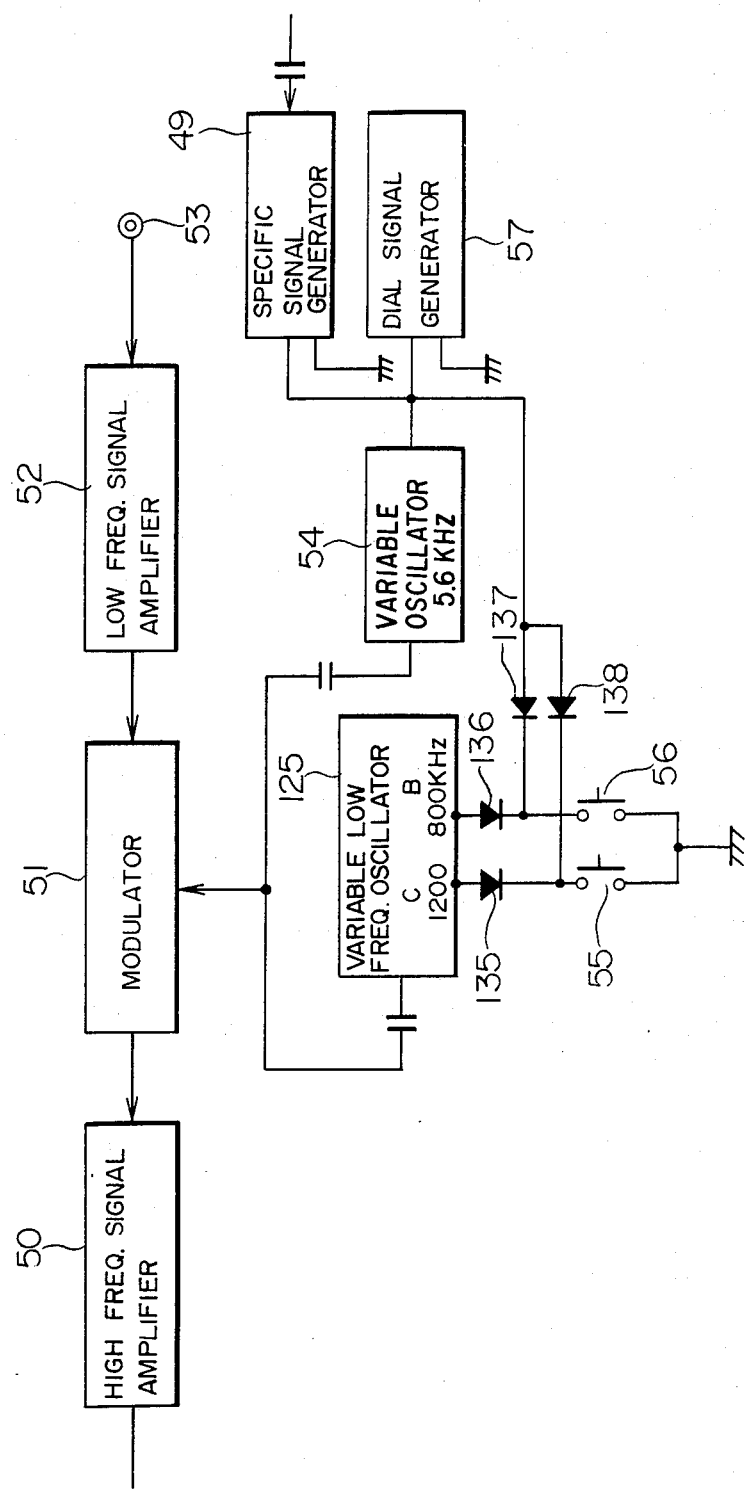

In FIGS. 8 and 9, the stop specific signal generator 126 and the receiver 139 are eliminated to simplify the circuits. The start signal from the sub-unit in the form of 5.6 KHz on/off signal is detected by the signal selector 8 and the specific signal detector 21, and the self-hold circuit 22 and the power supply 23 are activated by the control output of the detector 21. Under this condition, if a signal is sent from the dialing signal generator 57 of the sub-unit, the output of the signal selector 8 of FIG. 8 is turned on and off to open and close the contact circuit 31 of the relay 31 so that the dialing signal is sent out to the telephone line 112. When the start specific signal is applied to the signal selector 8, a similar signal is produced at the output thereof, but since this signal is fast and of very short duration, the relay 13 is not activated. The subsequent operation is same as that of FIG. 1. When the speech is to be transferred from the sub-unit A to the sub-unit B, the 5.6 KHz signal and the 800 Hz signal are sent from the sub-unit. The 800 Hz signal passes through the detector 3 of the receiver and is transferred to the amplifier 30 of the transmitter. The 5.6 KHz output is applied to the transistors 117 and 119 to open the transfer circuit and ground the speech circuit, as described in connection with FIG. 6. The power is supplied from the power supply 24 by the squelch circuit, as explained above. The press-to-talk type speech may be attained between the sub-units as explained in connection with FIGS. 1 and 2. FIG. 9 shows only the signal send circuit of the sub-unit and other circuits are omitted because they are identical to those of FIG. 2. When the sub-unit B is to be called, the call switch 56 is closed and the variable low frequency oscillator 125 oscillates at 800 Hz, and the output thereof is applied to the modulator 51, as is done in FIG. 5. On the other hand, the 5.6 KHz oscillator 54 oscillates because the start terminal thereof is grounded by the diode 137, and the output thereof is also applied to the modulator 51. Thus, both the 800 Hz signal and the 5.6 KHz signal are sent and they are received by the receiver of the master unit. The subsequent operation is identical to that explained in connection with FIG. 8.

Figure 10:
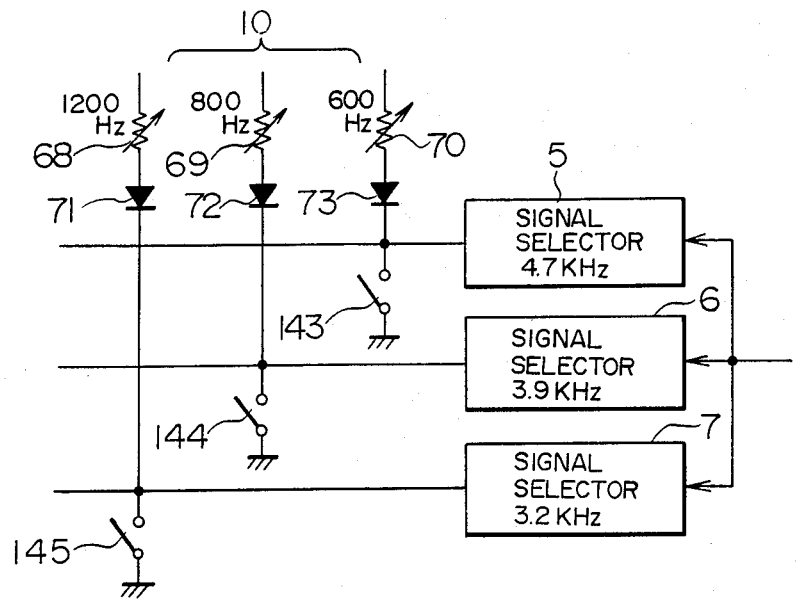
FIGS. 10a–10b show a partially modified connection diagrams for calling any one of the sub-units by the master unit of FIG. 1.
Figure 10:
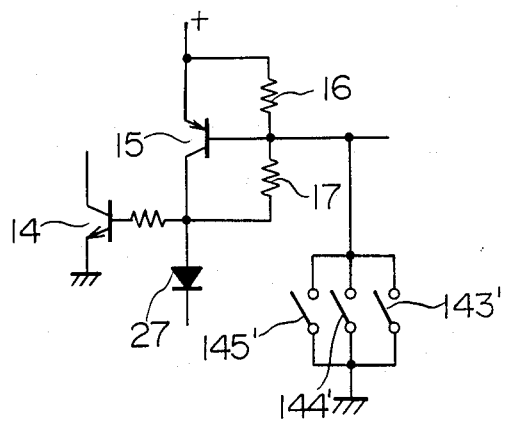

FIGS. 10A and 10B show an embodiment of the present invention in which the master unit can call any one of the sub-units. They show only portions of FIGS. 1 and 3 and others are omitted. When the sub-unit A is to be called, the output terminal of the signal selector 5 in FIG. 10A is grounded by the switch 143 so that the variable frequency oscillator 10 oscillates at 600 Hz to call the sub-unit A. As shown in FIG. 10B, the base of the transistor 15 is grounded by the switch 143' which is ganged with the switch 143, and the power is supplied to the transmitter through the diode 27 as explained in connection with FIG. 1. The sub-unit A is thus called in the manner described above. If an intercom transceiver is provided in the master unit, the speech may be attained between the sub-unit A and the master unit. Various known methods to use the master unit as the intercom unit may be used and detail thereof is omitted here. As explained above in connection with FIGS. 1 and 2, when the sub-unit A calls the sub-unit B to transfer the call received by the sub-unit A to the sub-unit B, there is no means to confirm whether the sub-unit B has responded to the call. However, if the sub-unit B emits an electromagnetic wave, the master unit simultaneously receives the electromagnetic waves from the sub-units A and B and they are sent to the sub-unit A. As a result, the sub-unit A receives a somewhat complex tone and the sub-unit A can guess that the sub-unit B has responded, although it is very uncertain. It is ideal to transfer the call to the sub-unit B after the speech between the sub-units A and B. However, if the press-to-talk type speech is made between the sub-units A and B, both sub-units may assume the stand-by mode or receive mode in the course of the speech. During such a period, the electromagnetic waves to the master unit are interrupted, and the output of the squelch circuit 9 shown in FIG. 1 ceases and the self-hold circuit 22 and the relay are reset so that the speech line is disconnected. In order to avoid this problem, the stop specific signal generator 126 and the receiver 139 may be used as shown in FIG. 6. However, since the stop specific signal is sent when the electromagnetic wave is interrupted as explained in connection with FIG. 7, it is not a solution to the problem encountered in the transfer.

Figure 11:
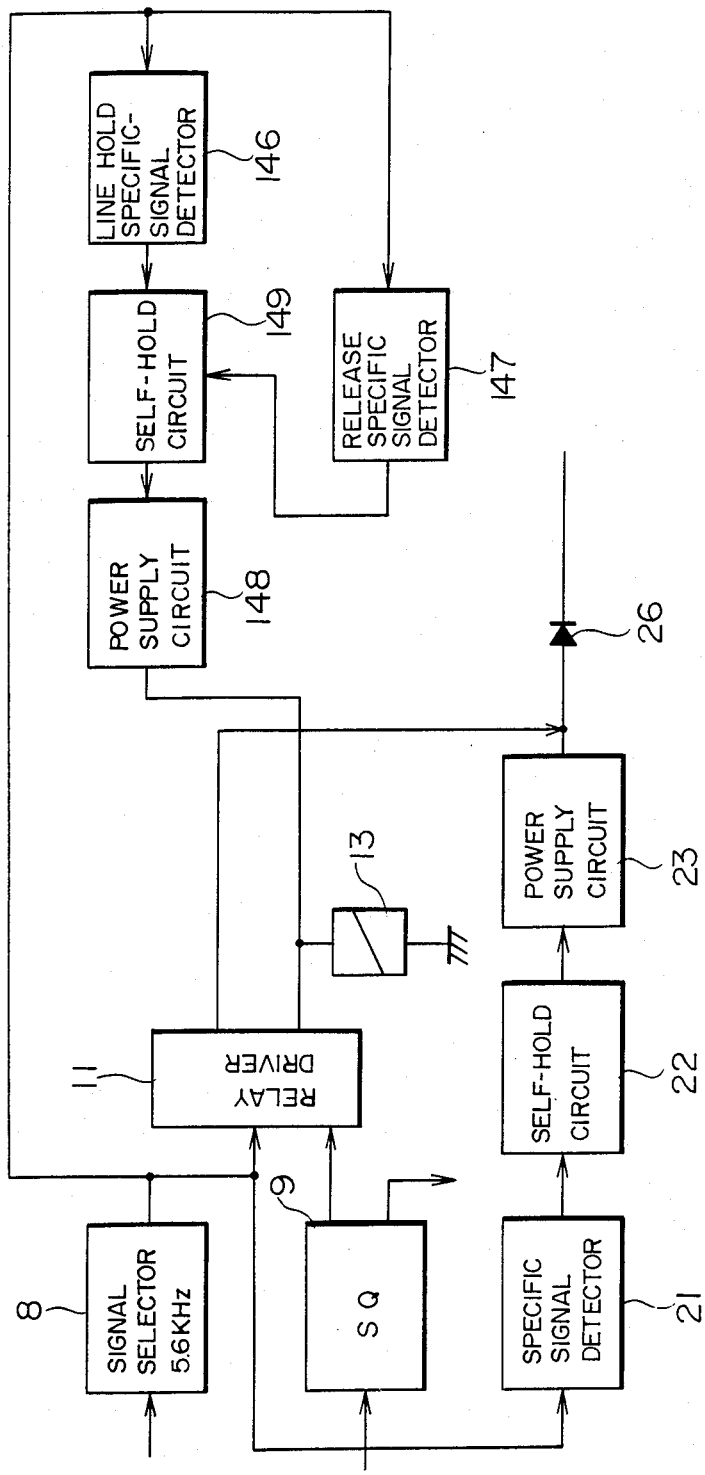
FIG. 11 shows a partially modified connection diagram of the master unit for preventing a master unit self-hold circuit from being reset in the transfer between the sub-units in the first embodiment.

FIG. 11 shows an embodiment of the present invention which solves the above problem. It shows a circuit diagram of the master unit. Portions not shown in FIG. 11 are identical to those of FIG. 1. The signal may be readily sent in the manner explained in connection with FIGS. 2, 5 and 7.

In FIG. 11, power supply 148, self-hold circuit 149, line hold specific signal detector 146 and release specific signal detector 147 are additionally provided. When the speech from the external commercial telephone line is to be held for a short time, the sub-unit generates the line hold specific signal. Thus, the circuits 146, 149 and 148 are activated and the relay 13 is actuated to close the contact 31 to hold the line. Since this operation is not affected by the interruption of the electromagnetic wave, the call to other sub-units or the press-to-talk type speech ma be carried out during this period. After the transfer to the sub-unit has been completed, the release specific signal is generated by the sub-unit so that the self-hold circuit 149 is reset and the supply of power to the relay 13 is stopped. Since the relay 13 has been actuated by the signal from other sub-unit, the speech is not disturbed and the troubles in the transfer described above can be eliminated.

The system in which the signal to call the sub-unit B from the sub-unit A is sent from the sub-unit A and it is sent to the sub-unit B through the master unit as shown in FIGS. 6 and 7, and the system in which the call signal from the sub-unit A is converted to the call signal for the sub-unit B and it is sent to the sub-unit B as shown in FIGS. 1 and 2 are compared. In the system of FIG. 1, the signal selectors 5, 6, 7 and 8 and the call variable frequency oscillator 10 are essential but the sub-unit needs only one variable frequency oscillator 54. Thus, the sub-unit is simplified. On the other hand, if the control frequencies $f_4$–$f_6$ are too low, they are close to an audio frequency and not alternated by the low frequency amplifier 3, matching circuit 4 and telephone line but reach the destination unit. In such a case, a low-pass filter is required. As the number of sub-units increases, the number of signal selectors also increases and this may raise a problem. However, higher control frequencies may be selected if the filters of narrower band which are of small size and low cost are provided. Digital filters may be used depending on the size and cost. In FIGS. 6 and 7, the master unit needs only two signal selectors 5 and 8 and the control circuit 140 for controlling the low frequency amplifier 3, and the sub-unit the call signal oscillator 125 and the controlling variable frequency oscillator 54. The signal from the sub-unit A has an increased noise because it is sent via the master unit.

Figure 12:
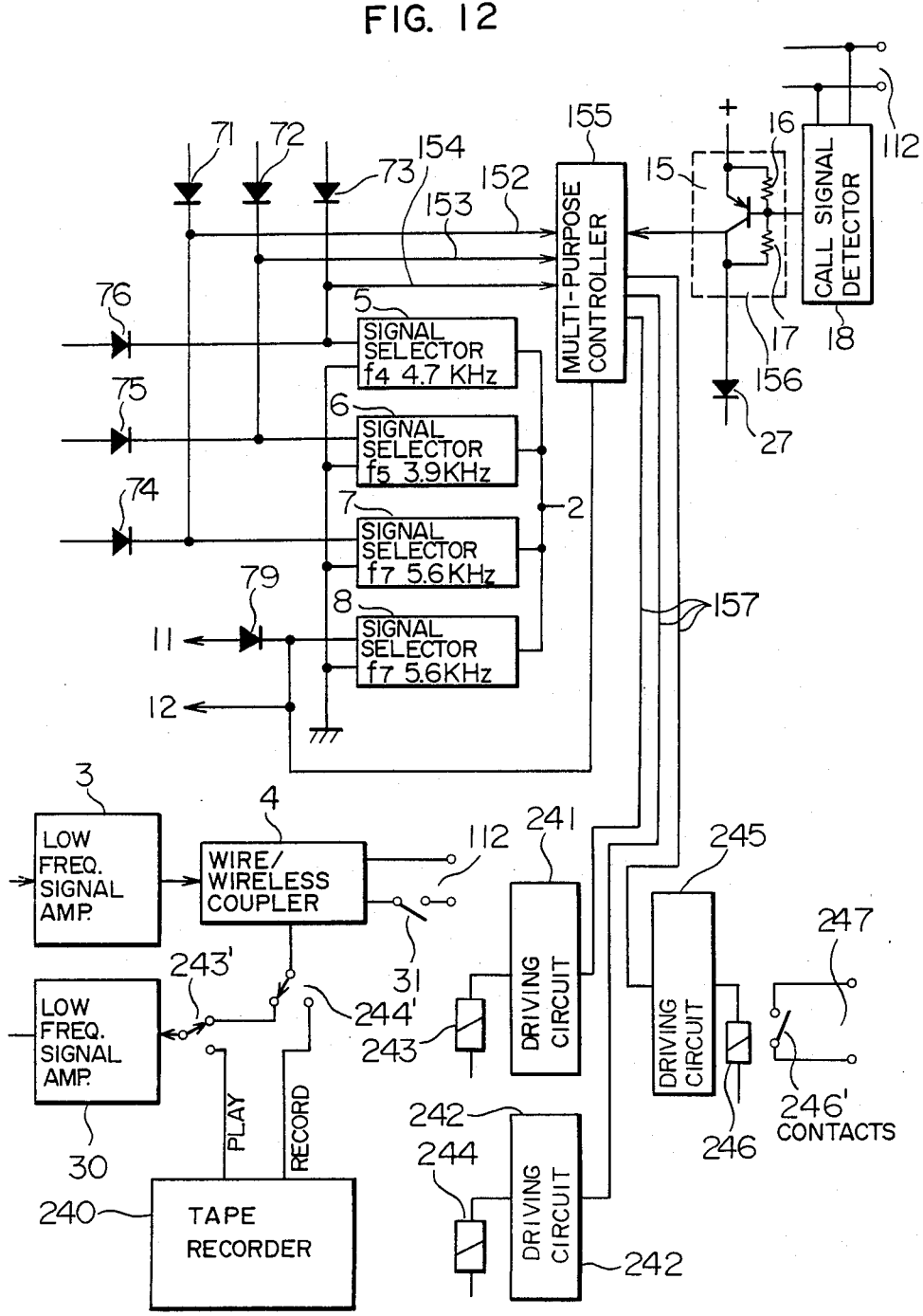
FIG. 12 shows a connection diagram of a fourth embodiment of the present invention in which a multipurpose controller is provided in the master unit to control by a signal from the sub-units.

FIG. 12 shows an embodiment of the present invention in which the master unit is provided with a multi-purpose controller 155. In FIG. 12, a sub-unit to be called from the external telephone line can be designated by the sub-unit Portions not shown in FIG. 12 are similar to those of FIG. 1. In FIG. 1, when a high voltage call signal is applied to the telephone line 112, the collector circuit of the transistor 14 is repeatedly grounded and opened in accordance with the signal so that the variable frequency oscillator 10 repeatedly starts and stops the oscillation at $f_1$ (600 Hz) to call the sub-unit A (shown in FIG. 2). Accordingly, if the collector of the transistor 14 is connected to the output terminals of the signal selector 6, the $f_2$ (800 Hz) signal is sent from the master unit to call the sub-unit B. Similarly, the sub-unit C is called by $f_7$. The controller 155 of FIG. 12 accomplishes the above switching electronically by the signal from the sub-unit When the sub-unit sends a combination of dial digits by the carrier frequency $f_7$ (5.6 KHz), the multi-purpose controller 155 detects it and sends the signal of the telephone line to one of the output terminals 152, 153 and 154 depending on the predetermined signal. If a D.C. square wave is used as it is, the waveform is distorted in the transmission. Accordingly, the dialing signal of the sub-unit is carried by the carrier $f_8$ (5.6 KHz). The circuits of the multi-purpose controller 155 can be readily attained by known electronic technologies. Simultaneous call to sequentially call the sub-units from the telephone line at an interval of several seconds is also readily attained. The signal selectors 5–7 may be provided with the call oscillators to attain the simultaneous call of the sub-units from the telephone line. Similarly, by changing the combination of dialing digits of the sub-unit, the output may be produced at any one of the output terminals 157 or open/short states may be changed in accordance with the signal. Thus, various equipments may be operated or the relay may be operated in accordance with the change to attain complex switching. For example, in FIG. 12, numeral 240 denotes a tape recorder having the function of automatic response and record. Numerals 241 and 242 denote drivers for driving relays 243 and 244 denote drivers, and numerals 243' and 244' denote contact circuits of the relays 243 and 244, respectively. When the relay 243 is actuated, the contact 243' is thrown to the opposite position to that shown in FIG. 12 and the voice input terminal of the tape recorder is connected to the input terminal of the transmitter amplifier 30. Thus, the sub-unit receives the transmitted electromagnetic wave to reproduce the recorded content of the tape recorder. When the relay 244 is actuated, the contact 244' is thrown to the opposite position to that shown in FIG. 12 and a voice from the external telephone is applied to a record terminal of the tape recorder. Since the start, stop, record and reproduce operations of the tape recorder can be attained by known means, control circuits therefor are omitted in the Figure. The driver 245 functions to actuate the relay 246 to open or close the contact circuit 246' in order to turn on and off a light or open and close a garage door. As described above, by sending the specific signal from the sub-unit to activate the multi-purpose controller 155 of the master unit to produce the output at the desired one of the output terminals 157, the desired unit may be activated. In the above explanation, means for activating the relay 13 to connect the contact circuit to the external telephone and means for controlling the master unit from the sub-unit to establish the speech mode are identical to those explained above and the explanation thereof is omitted. Similarly it is possible to switch the function to an intercom function to permit speech between a guest at a porch and the sub-unit, open and close a door or turn on and off a light by the known technologies, although details thereof are omitted. The master unit may send a signal in response to the signal from the sub-unit to switch a specified sub-unit from the stand-by mode to the speech mode for several seconds. In this case, if the sub-unit is placed in a child's room or baby room, the status of child's or baby room can be monitored by the sub-unit. In order to switch the sub-unit from the stand-by mode to the transmission mode by the signal from the master unit, one of various known techniques may be used. For example, the delay circuit shown in FIG. 7 may be used. In FIG. 7, the transmission is maintained for a predetermined period after the turn-off of power. In the present embodiment, the power is continuously supplied to the transmitter for the predetermined period after the specific signal has ceased.

As described above, in the cordless telephone system, a plurality of sub-units are provided for one master unit and the controller in the master unit is activated by the signal from any one of the sub-units so that signal or speech can be transferred to any sub-unit. Accordingly, the speech addressed to one sub-unit can be transferred to another sub-unit, and the press-to-talk type speech between the sub-units may be attained. Even if a wrong unit is called, it is not necessary for a person at the calling unit to go to the place of the master unit or to the place of called person, and the inconvenience which would be brought due to the cordless telephone is eliminated. Since the dialing function of the sub-unit is used only for dialing the telephone number and normally idle, the multi-purpose controller is provided in the master unit and the output is produced at one of the output terminals of the controller by the combination of the dial digits from the sub-unit so that various functions are carried out. In the previous embodiment, only a specified sub-unit can respond to the call from the telephone line. In the present embodiment, the sub-unit which can respond to the call may be changed by the signal from the sub-unit. Further, by providing the call oscillator in the master unit, all sub-units may be simultaneously called from the external telephone line. By using the tape recorder, the master unit may be switched to the automatic responding and recording telephone by the signal from the sub-unit, and the recorded content may be reproduced by the sub-unit. The intercom function may also be provided to monitor a child's room, open and close a garage door or turn a light on and off. Since all functions of the master unit can be controlled from the master unit, the master unit may be placed at an unaccessible high position so that a reach range of the electromagnetic wave is expanded. Further, the master unit may be housed at a non-obtrusive position such as in a locker to save a space. As described above, the present invention permits 100% utilization of the functions o the cordless telephone set and offers a high practical value.

Figure 13:
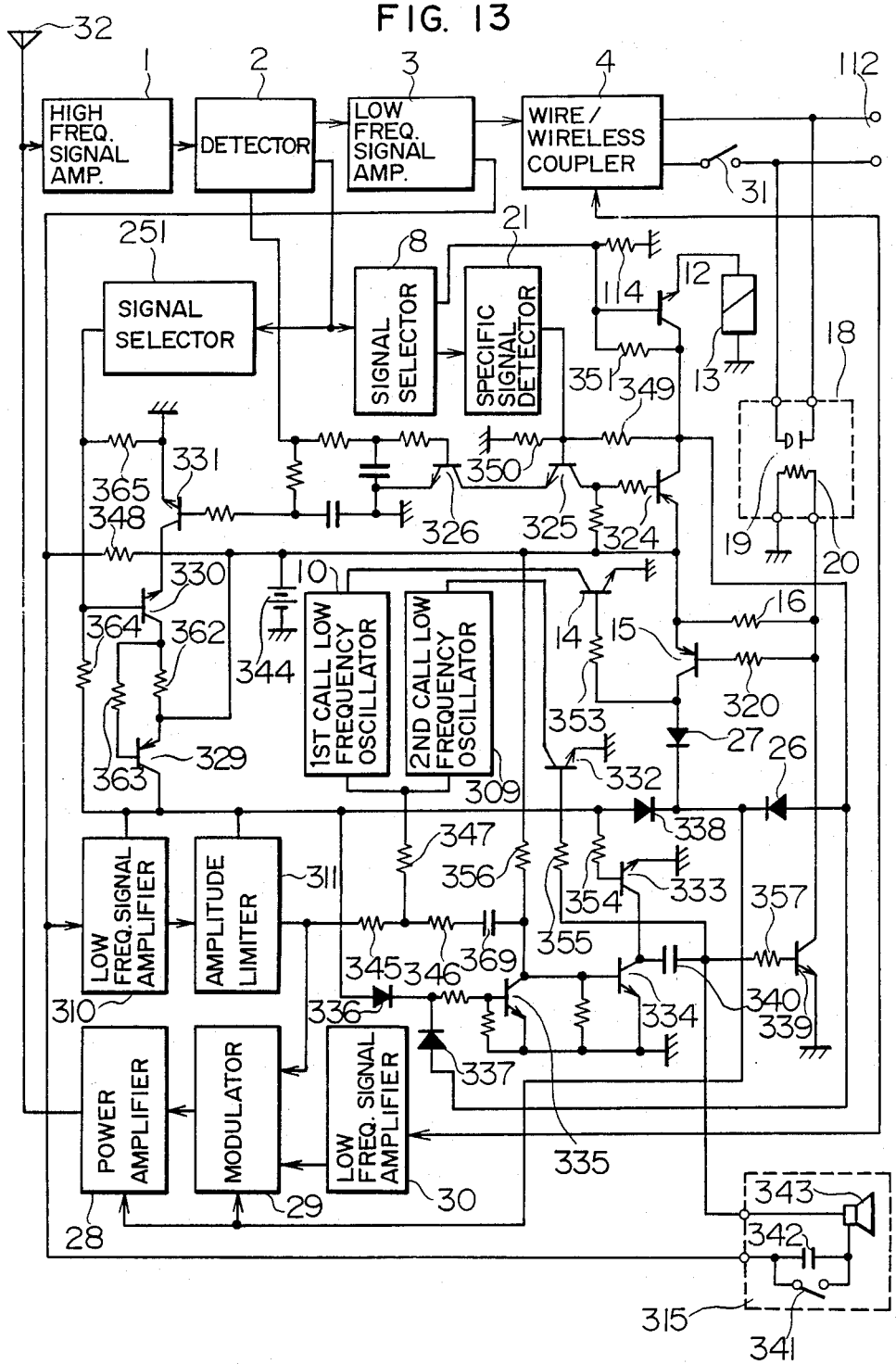
FIG. 13 shows a connection diagram of a fifth embodiment of the present invention in which an intercom unit is connected to the master unit.

FIG. 13 shows a fifth embodiment of the present invention in which an intercom unit is connected to a master unit. Numeral 1 denotes an RF amplifier of a receiver, numeral 2 denotes a detector, numeral 3 denotes a low frequency amplifier, numeral 4 denotes a coupler to an external commercial telephone line, numerals 251 and 8 denote signal selectors for producing outputs in response to specific frequency signal inputs, numeral 21 denotes a specific signal detector, numerals 10 and 309 denote first and second call low frequency oscillators, respectively, and numerals 310 and 311 denote low frequency amplifier and amplitude limiter, respectively. Numeral 28 denotes a power amplifier of a transmitter, numeral 29 denotes a modulator, numeral 30 denotes a low frequency amplifier and numeral 315 denotes an intercom of the intercom unit. Numeral 18 denotes a detector of a call signal from the external telephone line. If a push button 341 of the intercom 315 mounted at a porch is depressed, a power supply 344 is applied to a base of a transistor 339 through resistors 348 and 357 and the collector-emitter circuit of the transistor 339 is shorted. Thus, a current flows from the power supply 344 through the resistor 16 and the base of the transistor 15 is negatively biased relative to the emitter by the voltage drop across the resistor 16, as a result, a collector current flows through the diode 27 and is applied to the power amplifier 28 and the modulator 29 so that an electromagnetic wave is emitted. The current flowing through the transistor 15 flows into the base of the transistor 14 and the collector circuit thereof is shorted. As a result, the first call oscillator 10 is activated and the output thereof is applied to the modulator 29 through the resistors 347 and 345. Similarly, since a current flows into the transistor 332 through the resistor 355, the second call oscillator 309 is also activated and the output thereof is also applied to the modulator 29. Thus, the stand-by sub-unit (not shown) can reproduce mixed tone of the two frequencies. The mixture of the outputs of the two oscillators is sent out in order for the sub-unit to distinguish it from a normal calling tone of one frequency from the telephone line. While a battery 344 is shown as a power supply, an A.C. power may be rectified as is commonly done. The call oscillator 309 need not be a sine wave oscillator from the standpoint of its purpose but a square wave generator or intermittent oscillator may be used to achieve the same functions.

When the sub-unit not shown detects the call tone from the intercom and an intercom switch of the sub-unit is closed, the specific signal is sent for a very short time period to produce a positive output at the signal selector 251 of the master unit, and the output is applied to the base of the transistor 330. As the electromagnetic wave from the sub-unit is received, a positive output is produced at the squelch circuit (not shown) of the detector 2 and it is applied to the base of the transistor 331. As a result, collector circuits connected in series to the transistors 330 and 331 are shorted and the transistor 329 is rendered conductive. Since the output voltage of the transistor 329 is applied to the base of the transistor 330 through the resistor 364, the transistor 329 is kept conductive even after the specific signal has been extinguished, and the current is supplied to the transmitter through the diode 338. When the received electromagnetic wave extinguishes and the squelch output becomes zero, the base voltage of the transistor 331 becomes zero and the collector current thereof is opened. As a result, the current flowing through the transistor 329 is blocked and the initial state is restored and the supply of current to the transmitter is ceased. Under this condition, if the transmitter is in operation and speech is sent from the sub-unit, it is received, detected and amplified by the master unit so that an audio output appears at the output terminal of the amplifier 3 and it is applied to the speaker 343 through the capacitor 342. On the other hand, since the voltage from the transistor 329 is applied to the base of the transistor 333 through the resistor 354, the collector circuit of the transistor 333 is shorted. As a result, the audio voltage applied to the speaker 343 is grounded by the capacitor 340 and the audio current flows through the speaker to reproduce the speech from the sub-unit. On the other hand, when speech is made to the speaker 343, the speech voltage passes through the amplifier 310 and the amplitude limiter 311 and is applied to the modulator 29. Accordingly, when the speech is stopped at the sub-unit, the speech from the intercom can be reproduced. As explained above, since one speaker is used to send speech and receive speech, it is necessary to use the press-to-talk type speech. As is apparent from the above explanation, if the transmitter of the sub-unit is deactivated in the receive mode as is done in a conventional radio transceiver, the squelch signal in the master unit extinguishes and the supply of power to the transmitter is stopped. In this case, the transmitter is not activated until the specific signal is sent again. In order to avoid such a problem, it is necessary to deactivate only the low frequency amplifier of the transmitter instead of the transmitter in the receive mode. When the master unit receives the audio voltage, it is applied to the speaker 343 and the transmission amplifier 310. Since this voltage is much larger than the voltage produced by the speaker 343 in the speech send mode, the amplifier 310 is readily saturated and the transmitter is in an overmodulation state. The amplitude limiter 311 is provided to prevent such a problem. The audio signal produced by the amplitude limiter 311 is fairly distorted but it does not raise a problem to the sub-unit because the sub-unit is then in the transmission mode and the receiver thereof is not in operation. The operation of the conventional cordless telephone set is now explained. If a call signal appears at the telephone line terminal 112 when the telephone set is in an on-hook state, a discharge tube 19 of a photo-electric signal detector 18 repeatedly starts and stops discharge in accordance with the signal and a resistance of the resistor 20 varies accordingly. When the resistance drops below a predetermined value, a collector current flows into the transistor 15. The current is supplied to the transmitter through the diode 27, and also supplied to the base of the transistor 14 through the resistor 353 so that the collector circuit thereof is shorted. As a result, the call oscillator 10 oscillates and the output thereof is transmitted to the sub-unit to call the sub-unit When the speech switch is depressed in the sub-unit, the specific signal produced by modulating the specific carrier frequency is sent out and it is detected by the specific signal detector 21 of the master unit, which produces a positive output of a very short duration at the output terminal thereof. This output is applied to the base of the transistor 325 to short the collector circuit thereof. On the other hand, the positive squelch voltage from the detector 2 is applied to the base of the transistor 326. As a result, the base voltage of the transistor 324 drops, the transistor 324 conducts, a voltage appears in the collector circuit thereof and it is applied to the base of the transistor 325 through the resistor 349. As a result, even after the output of the detector 21 has ceased, the transistor 324 is kept conductive so long as the squelch output is applied to the transistor 326. This voltage is applied to the transmitters 28 and 29 through the diode 26. On the other hand, the voltage of the transistor 324 is applied to the transistor 12 and the relay 13 is actuated thereby so that the contact 31 thereof is closed. As a result, the call signal from the telephone line ceases and the speech between the sub-unit and the external telephone line is permitted. When a unit is to be called by dialing the telephone number from the sub-unit, the speech switch (not shown) of the sub-unit is depressed. Thus, the specific signal is sent out for a moment and the relay of the master unit is actuated to off-hook the telephone set and activate the transmitter. Under this condition, if the telephone number is dialed in the sub-unit, the on/off signal at the specific frequency is sent out in accordance with the dial number. In the master unit, the output of the specific signal selector 8 is turned on and off in accordance with the signal so that the relay 13 and the contact 31 thereof are switched on and off to send out the dialing signal.

The operations of the intercom and the cordless telephone have thus been described. In practice, they still have the following shortcomings. When the sub-unit makes the speech, the voice leaks to the speaker 343 of the intercom so that it may be intercepted. If the call switch 341 of the intercom is depressed during the speech, a large call tone is suddenly reproduced by the speaker and it is noisy and may hurt an ear. The same is true when the call is made from the external telephone line while the speech is made between the intercom and the sub-unit. An embodiment of the present invention which eliminates the above problems is explained. Assume that the call switch 341 of the intercom 315 is closed during the speech between the sub-unit and the external telephone set. In this case, since a voltage is applied from the power supply through the diode 337, the transistor 335 is shorted and the transistor 334 is opened. As a result, a secondary circuit of the capacitor 340 is opened and no current flows and the speaker 343 does not work. Since the transistors 339, 15, 14 and 332 are actuated by the switch 341, the call oscillators 10 and 309 are activated but the outputs thereof are divided at the junction of the resistors 347 and 345 by a circuit of a shunt resistor 346, a capacitor 369 and a transistor 335 so that approximately one tenth of the output is supplied to the modulator. Accordingly, the calling tone of the intercom is not disturbing but is rather convenient to notice the call from the intercom. The same is true where a call is made from the external telephone line during the speech between the intercom and the sub-unit. The output of the call oscillator is appropriately divided and it is applied to the modulator, as described above.

During the use of the intercom, a voltage is applied to the transistor 335 through the diode 336. Accordingly, the transistor 334 is open and the speaker 343 is not driven. The transistor 333 is provided to eliminate the above problem. By applying a voltage from the intercom power supply to the base of the transistor 333 through the resistor 354, the capacitor 340 is grounded and the speaker 343 is driven.

Figure 14:
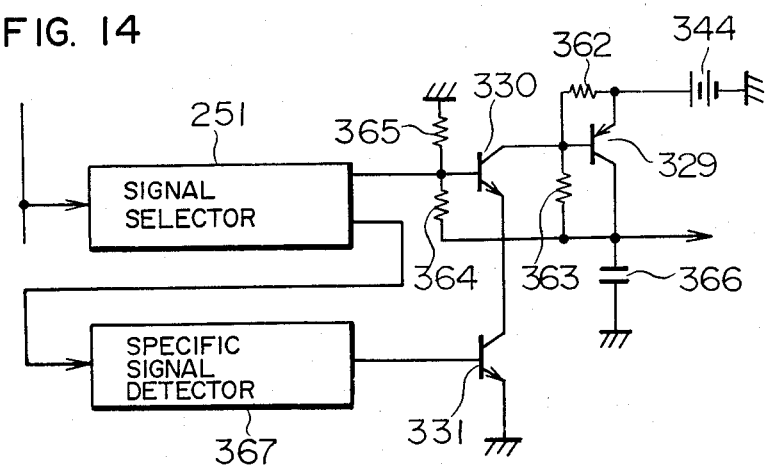
FIG. 14 shows a partially modified connection diagram for using predetermined signals for starting and releasing a power supply.

In the above embodiments, all power supplies are activated by the specific signal, and once they are activated, they are self-held. The squelch voltage is used to release the self-hold. FIG. 14 shows another embodiment of the present invention which uses the specific signals to activate and deactivate the power supply. Numeral 367 denotes a specific signal detector for deactivation which has been newly added. Other portions are identical to those of FIG. 13 and hence they are omitted. The detector 367 produces a positive output when there is no signal, and produces zero level output for a short period after the reception of the signal. Accordingly, the transistor 329 is rendered conductive by the start signal and the voltage of the power supply 344 appears across the capacitor 366, and when the stop signal is received, the transistor 331 is opened and no current flows through the resistor 362 and the transistors 330 and 331, and the transistor 329 is also opened to stop the supply of power.

Figure 15:
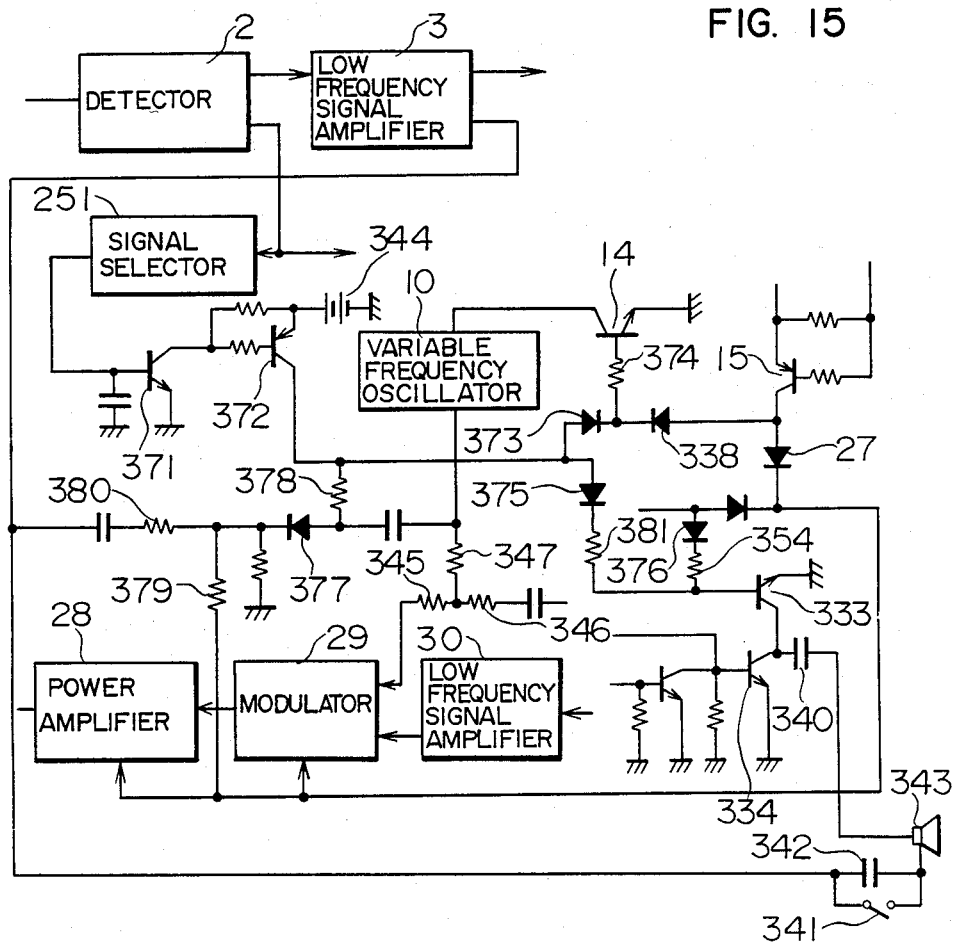
FIG. 15 shows a partially modified connection diagram for calling the intercom unit from the sub-unit.

FIG. 15 shows another embodiment of the present invention in which the sub-unit can call the intercom. When the intercom is mounted at a porch, it is sufficient that the intercom can call the sub-unit, but when the intercom is used by an aged person, patient, child or in a baby room, it is necessary that the sub-unit can call the intercom. In FIG. 15, portions which are common to those of FIG. 3 are omitted. Numeral 251 denotes a detector for a signal to call the intercom. When a call signal from the sub-unit is received, the detector 370 produces a positive output, a transistor 371 is shorted, a transistor 372 produces an output, and it is applied to a base of a transistor 333 through a resistor 381 so that a collector circuit thereof is shorted and a speaker 343 is activated. On the other hand, the output voltage is applied to a base of a transistor 14 through a diode 373 so that a call oscillator 10 is activated and an output thereof drives the speaker 343 through a diode 377 and a resistor 380. As is apparent from the explanation of FIG. 13, a start signal of the transmitter and a start signal of the intercom are not sent out and hence there is no risk that the signal to call the intercom is sent to another sub-unit. Since the call oscillator 10 is in operation, the call signal from the external telephone line and the call signal between the sub-units may be reproduced by the speaker 343. The diodes 377 and the resistor 379 are provided to eliminate such trouble. Since the transmitter 28 is in operation in any case, the transmission voltage is applied to the diode 377 in the reverse direction to open the diode 377 to eliminate the above problem.

Figure 16:
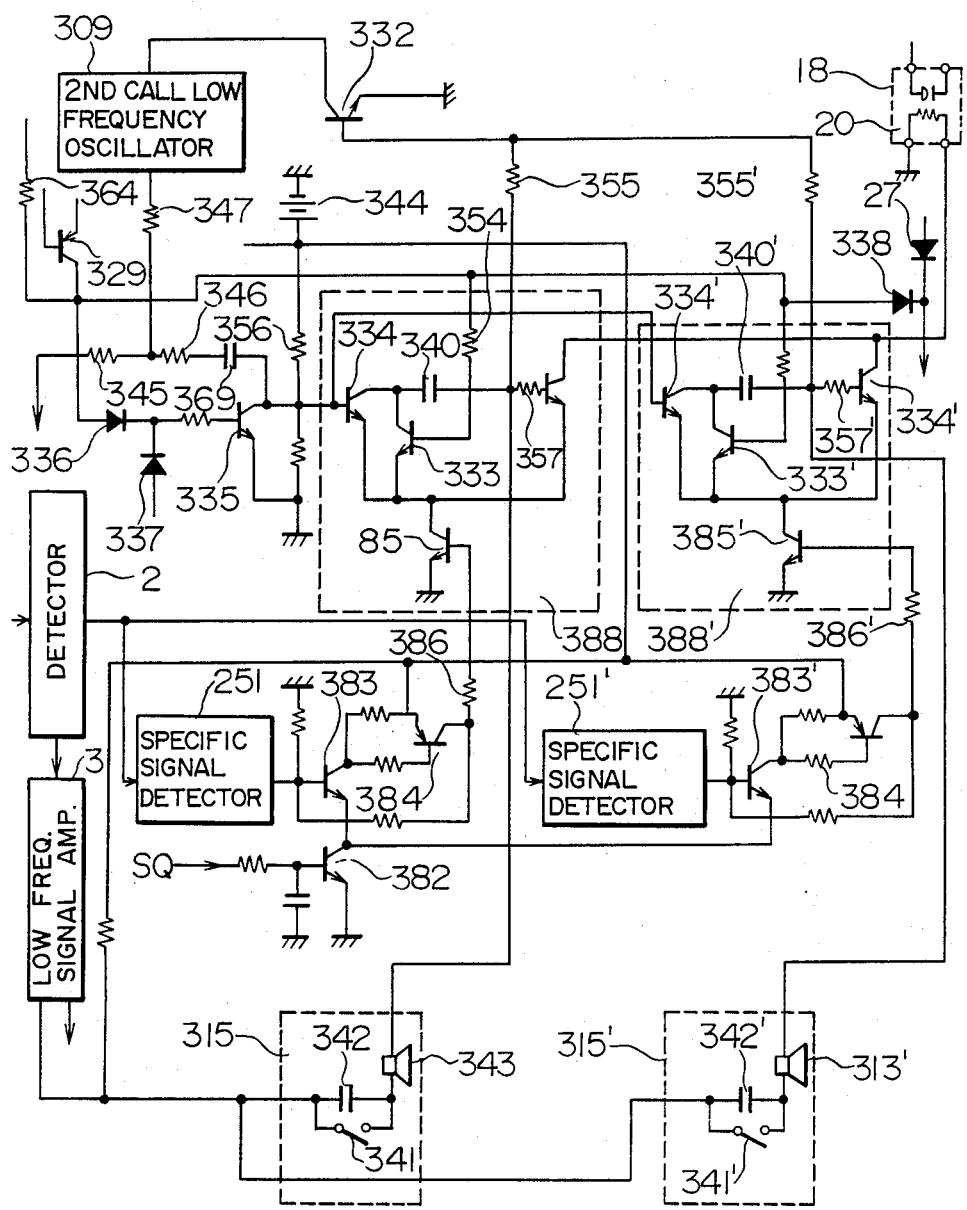
FIG. 16 shows a connection diagram of major portions of a sixth embodiment of the present invention in which two intercom units connected to the master unit are switched by the sub-unit.

FIG. 16 shows a sixth embodiment of the present invention in which two intercom units are connected to the master unit and they can be selectively used by the sub-unit. By providing two intercom units, one of them may be mounted at a porch and the other may be mounted near an aged person, patient, child or baby room. In FIG. 16, portions similar to those of FIG. 13 are omitted. Numerals 388 and 388' denote control circuits for grounding terminals of speakers 343 and 343', respectively. Those control circuits are selectively used by outputs of detectors 251 and 251' for specific signals from sub-units. When the sub-unit sends out a specific signal so that the specific signal detector 251 produces a positive output, a transistor 383 conducts and a transistor 384 produces an output, and a portion thereof is fed back so that the transistor 384 is self-held. As a result, the electromagnetic wave from the sub-unit stops and the output of the squelch circuit ceases. When the positive voltage from the squelch circuit terminates, a transistor 382 is opened but until then it continues to supply a current. Since the output voltage of the transistor 384 is applied to a base of a switching transistor 385 through a resistor 386, a control circuit 388 is activated. The operation thereof is identical to that explained in connection with FIG. 13. As a result, the intercom 315 is activated. Similarly, when a signal to activate the specific signal detector 251' is received from the sub-unit, the intercom 315' is activated. In this manner, the intercoms 315 and 315' may be selectively used from the sub-unit.

Figure 17:
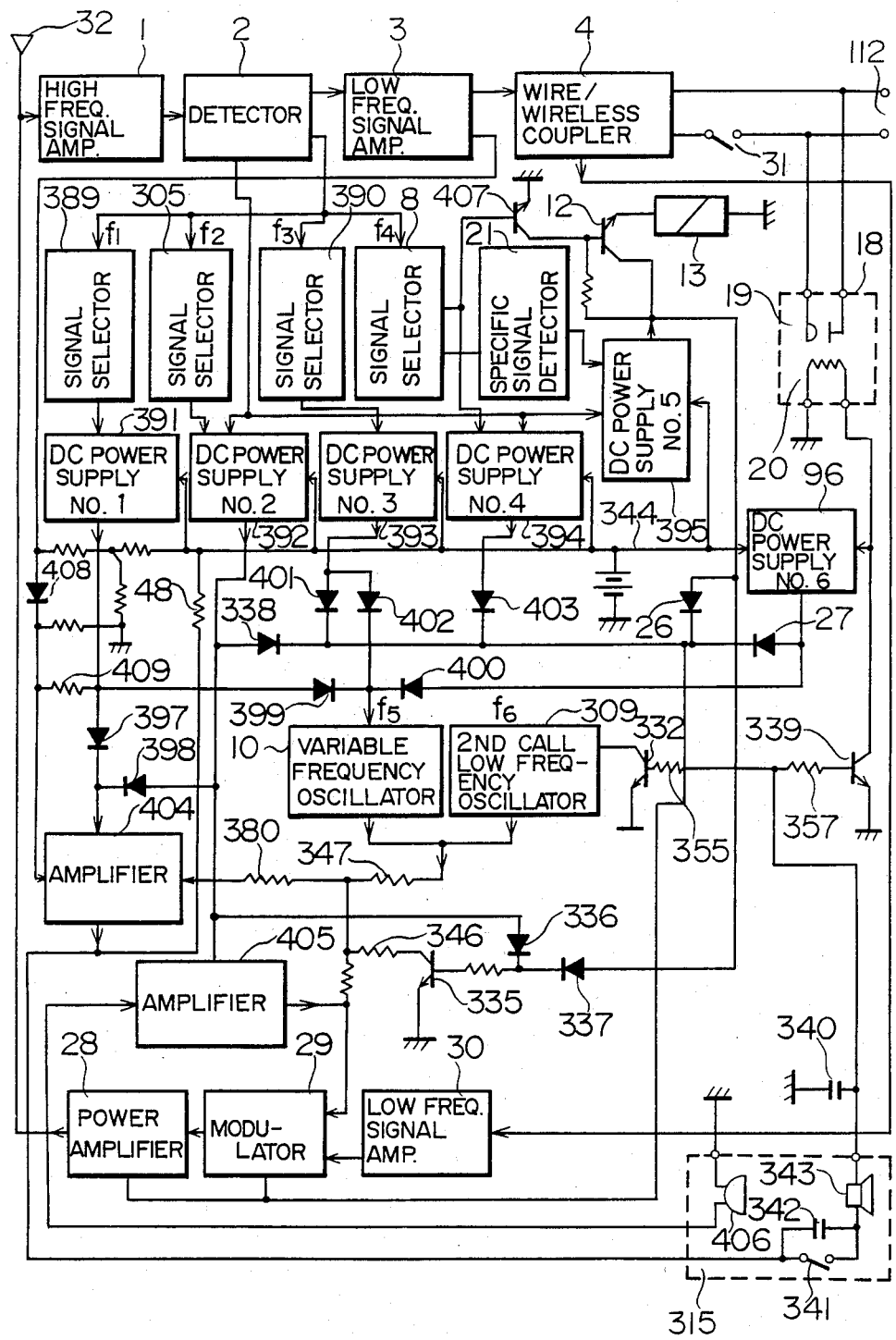
FIG. 17 shows a block diagram of major portions of a seventh embodiment in which a 4-wire intercom unit is connected to the master unit.

FIG. 17 shows a seventh embodiment of the present invention which uses a 4-wire intercom unit. The like elements to those shown in FIG. 16 are designated by the like numerals. Detailed circuit diagrams of power supplies 391–396 are shown in FIG. 16 and hence they are shown in FIG. 17 by blocks to avoid complexity. FIG. 17 shows an overall circuit diagram of a master unit of a practical cordless telephone set. Accordingly, it includes portions (such as those shown in FIG. 1) which are not relevant to the present embodiment such as circuits for speech between the sub-units. Because of block diagram, portions which are not necessary for the description such as power supply are omitted. The sub-unit for the master unit is also omitted because it can be readily implemented by known technique.

FIG. 17 is now explained in detail. When a guest depresses a switch 341 of an intercom mounted at a porch, a power of a power supply 344 is applied to bases of transistors 339 and 332 through a resistor 348 and a speaker. When a collector circuit of the transistor 339 is shorted, a power supply 96 is activated and transmitters 28 and 29 and call oscillators 10 and 309 are activated so that an electromagnetic wave modulated by call signals ($f_5$ and $f_6$) is emitted to call a sub-unit which is in a stand-by state. The sub-unit (not shown) detects the call from the intercom by mixed call tone of two frequencies ($f_5$ and $f_6$). When the intercom switch provided in the sub-unit is depressed, the sub-unit is set to the speech mode and sends out the $f_2$ signal for an initial short period. The specific signal is detected by the specific signal detector 305 of the master unit, the output of which activates the power supply 392 which has a self-hold function. The amplifiers 404 and 405 are activated by the power supply 392. Accordingly, if the speech is made from the sub-unit, the voice is reproduced by the speaker 343 through the low frequency amplifiers 3 and 404. If the speech is made to the microphone 406, the voice is sent to the sub-unit through the amplifier 405, the modulator 29 and the power amplifier 28 so that the intercom unit and the sub-unit can make speech each other through the master unit. When the intercom is to be called from the sub-unit, the intercom call button provided in the sub-unit is depressed so that the call signal (f1) is sent to select the signal of the master unit and activate the detector 389, the output of which activates the power supply 391 which does not self-hold. Accordingly, the output of the oscillator 10 drives the speaker 343 through the amplifier 404. When the intercom button 341 is depressed during the speech between the sub-unit and the external telephone line, a large call tone is suddenly reproduced and this makes a noise. Accordingly, a branch point of call signal paths 347 and 345 is grounded through a resistor 346 so that the output is attenuated to approximately one tenth. When a call from the external telephone line is made during the speech between the intercom and the sub-unit, the operation voltage of the intercom is applied to the base of the transistor 335 to lower the level of the call tone. The signal selector 390 is used for the call between the sub-units. The call oscillator 10 and the transmitter are activated by the output of the signal selector 390. Numeral 21 denotes a coded signal detector. Only when the output thereof is present, the power supply 395 is activated to activate or deactivate the relay 13 to dial the number. If only the signal (f4) is sent from the sub-unit without sending out the code signal, only the power supply 394 is activated and the speech can be made between the sub-units by the press-to-talk system through the master unit without regard to the external telephone line, as described in connection with the embodiment of FIG. 1. When the call signal from the external telephone line exists, the power supply 96 is activated and the transmitter and the call oscillator 10 are activated to call the sub-unit. In the above description, when the intercom is to be called from the sub-unit, the power supply 391 is activated. Since the amplifier 404 is now activated, the signal from the detector 3 as well as the call signal from the oscillator 10 are amplified. This may cause a trouble. Accordingly, the diode 408 is used to apply the voltage from the power supply 391 in the reverse direction so that the diode 408 is opened. The output of the squelch circuit SQ is applied to the power supplies 392, 394 and 395 in order to release the power supply from its self-hold state when the speech is terminated, the electromagnetic wave ceases and the squelch output ceases.

In accordance with the present embodiment, in the cordless telephone system having the master unit connected to the telephone line and having the radio transceiver and the sub-unit having the radio transceiver corresponding to the master unit and being capable of transmitting and receiving speech to and from the telephone line, the intercom unit may be connected to the master unit and the master unit is provided with means for controlling the intercom unit. The control means is controlled from the sub-unit so that the speech can be made between the sub-unit and the intercom through the master unit and the call tone from the intercom is reproduced in the sub-unit. As a result, it is not necessary for an operator to walk to the place of the master unit of the intercom to make the speech each time call is made. By placing the sub-unit near the operator, it does not happen that the operator cannot hear the call tone because he/she is distant from the master unit. Since it is possible to activate the intercom from the sub-unit, and to monitor the intercom from the sub-unit, if it is mounted in the patient, kid or baby room, a housekeeper can monitor the status of the room at any time wherever he/she is. When it is mounted in the kid room, the intercom may be called from the sub-unit, and the call and speech may be made at any time. When a plurality of intercom units are connected so that they are selectively used by the sub-unit, they may be used for porch, patient room and kid room parallely. Accordingly, the present invention offers a very high practical value.

Figure 18:
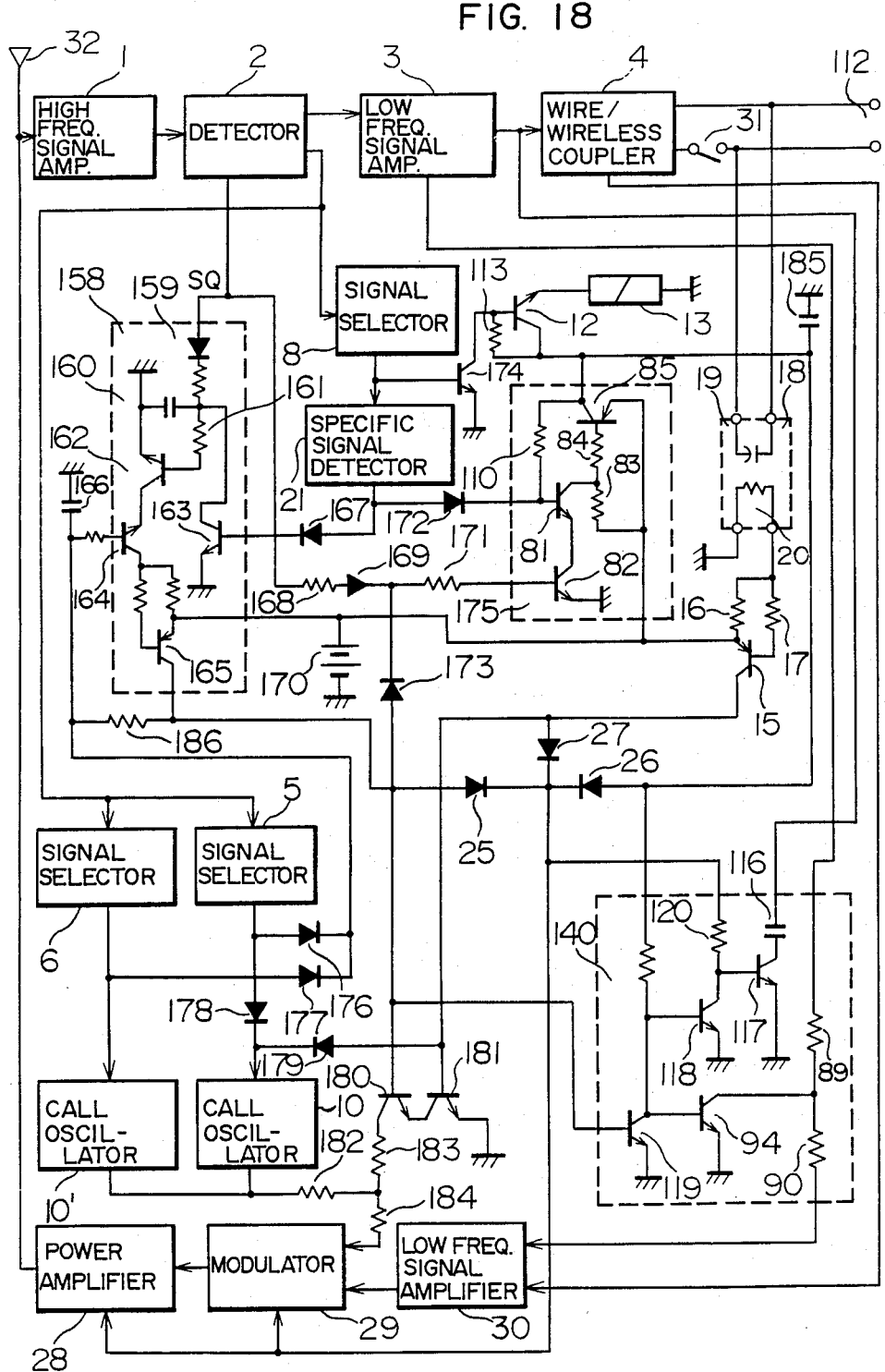
FIG. 18 shows a connection diagram of an eighth embodiment of the present invention which is a modification of FIG. 1 to reset a master unit repeater by using, at the end of speech, a predetermined signal transmitter which is also used at the start of speech in the transfer between the sub-units.
Figure 19:
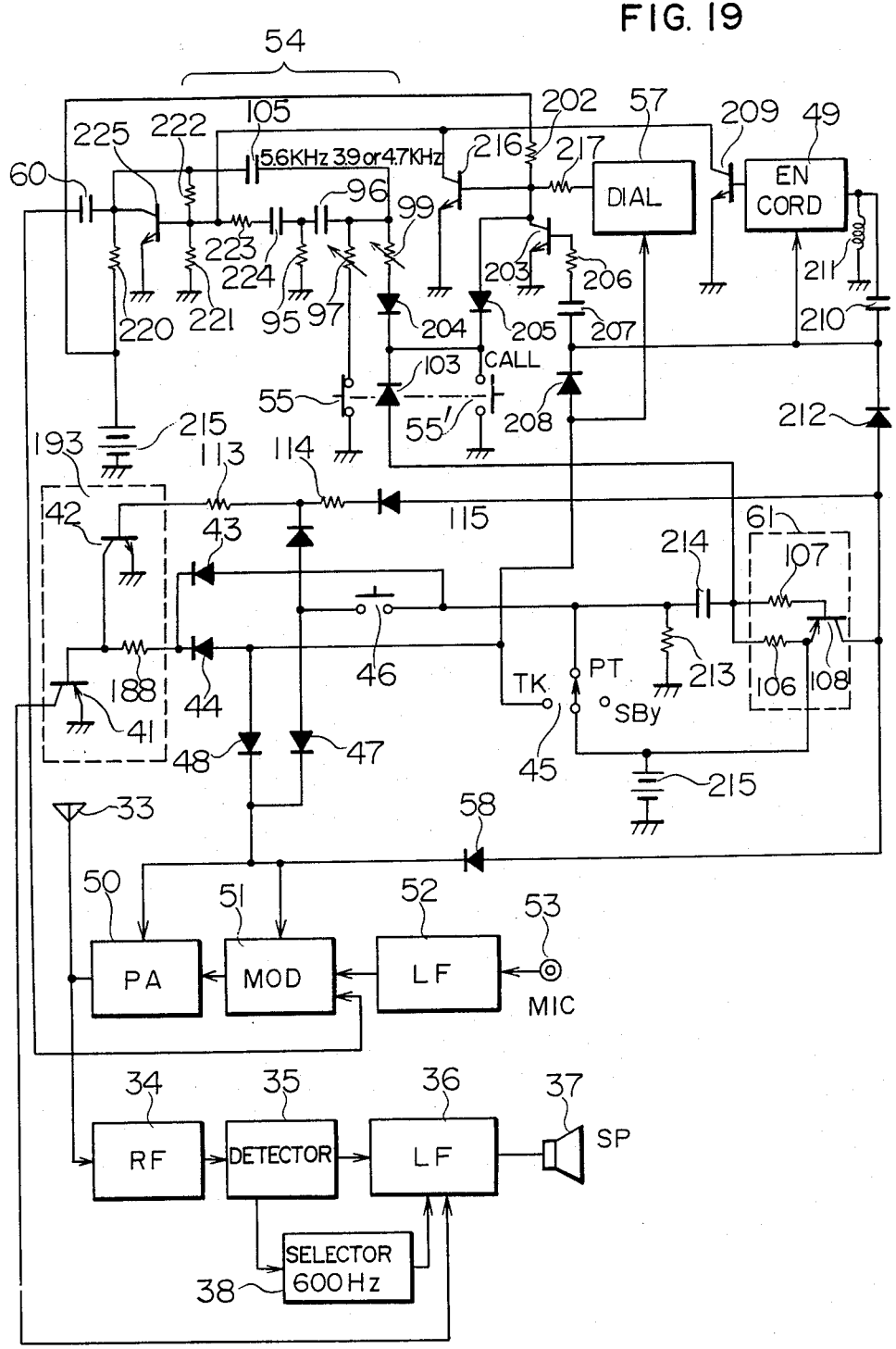
FIG 19 shows a connection diagram of a sub-unit for the master unit of FIG. 18.

FIG. 18 shows an eighth embodiment of the present invention. The like elements to those shown in the first embodiment of FIG. 1 are designated by the like numerals, and the operation of the main unit is same as that of FIG. 1 and the explanation thereof is omitted. Only the additional portion is explained in detail. The operation is now described in sequence. When a call signal from the external telephone line is received, the signal detector 18 is activated and the power supply 15 is activated to supply the power to the transmitters 28 and 29 through the diode 27. The power is also supplied to the call oscillator 10 through the diode 179. In the present embodiment, the 600 Hz oscillation frequency is supplied to the modulator 29 to call the sub-unit A as explained in connection with FIG. 19. When the called sub-unit A is switched from the stand-by mode to the talk mode, a code signal carried by 5.6 KHz signal is sent out from the sub-unit for a short period and it activates the specific signal detector (decoder) 21. The power supply 175 is activated by the output of the detector 21 and the squelch (SQ) output produced by the received electromagnetic wave, and the relay 13 is activated to close the contact 31 and off-hooks the telephone line. On the other hand, the power is supplied to the transmitters 28 and 29 through the diode 26. The power supply 175 continues to self-hold by the resistor 110 even after the specific signal has been terminated, and when the electromagnetic wave from the sub-unit ceases and the output from the squelch circuit ceases, the supply of power is stopped, as described in connection with the above embodiment. Under this condition, the speech can be made between the sub-unit A and the external telephone in the same manner as the conventional telephone. The transfer of the call directed to the sub-unit A to the sub-unit B is explained. The manipulation of the sub-unit will be explained in connection with FIG. 19, and the operation of the master unit is explained here. When a button 55 and 55' shown in FIG. 19 in the sub-unit A is depressed to call the sub-unit B, a signal of 3.9 KHz is sent so that the signal selector 6 of the master unit produces an output which activates the call oscillator 10'. On the other hand, the output of the signal selector 6 is also applied to the power supply 15. Since the output of the squelch circuit SQ is also applied to the power supply 158, the power supply is activated. Since a portion of output thereof is applied to the base of the transistor 164 through the resistor 186, it self-holds to continuously supply the power even after the output from the signal selector 6 has been ceased. Since a portion of the output of the power supply 158 is applied to the base of the transistor 82 through the diode 173, the operation of the power supply 175 is not stopped unless the output from the power supply 158 ceases. Thus, during the speech for the transfer between the sub-units, whatever long time it may be, the external telephone line is kept held. Since the speech between the sub-units is made by the press-to-talk system, it may happen that both sub-units are in the receive mode and the period of this state may be long. If the power supply is reset under this condition to stop the supply of power, the hold of the external telephone line is released. In order to prevent this from occurring, the resistor 161 and the capacitor 160 are selected such that the time constant of the squelch circuit is sufficiently large, such as 5-10 seconds. Numeral 140 denotes an auxiliary controller for effecting the press-to-talk type speech between the sub-units. It is identical to that shown in FIG. 6 and the explanation thereof is omitted. Since the auxiliary controller 140 is controlled by the output of the power supply 158, if the power supply 158 continues to operate by the time constant of the resistor 160 and the capacitor 161 even after the termination of the speech for the transfer between the sub-units, the auxiliary controller 140 also continues to operate and the output circuit of the low frequency amplifier 3 is shorted by the capacitor 116 during that period so that the speech between the sub-unit and the external line is not started. The transistor circuit 163 is provided to eliminate the above problem. At the beginning of the speech, the coded specific signal is sent from the sub-unit for a short period. Since the sub-unit has the transmitter for the specific signal, the specific signal is also used at the end of the speech between the sub-units. Thus, the above problem is eliminated without providing a special device, and the increase of size and cost of the apparatus are prevented. Details thereof are shown in FIG. 19. At the end of the speech between the units or when one of the sub-units is switched to the external line for speech, the specific signal is sent for a short period and the specific signal detector 21 again produces an output, which shorts the transistor 163. As a result, the charge in the capacitor 160 is instantly discharged and the power supply 158 is reset to stop the supply of power. Accordingly, the speech can be made between the sub-unit and the external telephone without trouble. Since the electromagnetic wave is always emitted from the sub-unit, it does not happen that the power supply is deactivated. The two series-connected transistors 180 and 181 constitute an AND circuit which reduces the levels of the outputs of the call oscillators 10 and 10' to approximately one tenth when the power supply 158 for the speech between the sub-units and the external call power supply 15 are simultaneously activated, in order to prevent a large call tone from being suddenly reproduced during the speech between the sub-units. FIG. 19 shows an embodiment of the sub-unit corresponding to FIG. 18. It shows the sub-unit A. In the sub-unit A, the selection frequency of the frequency selector 38 is 600 Hz while it is 800 Hz in the sub-unit B. In the sub-unit A, the frequency of the oscillator 54 to call the other unit is 3.9 KHz while it is 4.7 KHz in the sub-unit B so that each sub-unit can call the other. The frequencies are for explanation purpose only and they may be changed depending on the condition. The signaling system may be mixed wave, serial signal or pulse coded signal with appropriate encoder and decoder. While only two sub-units A and B are shown, three, four or more sub-units may be used. When the switch 45 is in the stand-by (SBy) position, only the receiver is activated. The controller 193 is not supplied with power and the low frequency amplifier 36 is not activated because the transistor 41 is opened. When the frequency selector 38 receives the signal of 600 Hz, the output thereof is applied to the low frequency amplifier 36 and the amplified signal drives the speaker to inform the call. The calls from the external line and the sub-unit B are discriminated by the intermittent state of the call tone, that is, the call tone from the external line is regular and fast, and the call tone from the sub-unit is irregular and slow because of manual operation. When the call from the sub-unit B is detected, the switch 45 is thrown to the press-to-talk type talk position PT so that the power is supplied via diode 43 and resistor 188 to the controller 193, the transistor 41 is shorted and the low frequency amplifier 36 is activated. When the press-to-talk button 46 is depressed, the power is supplied to the transmitter 50 through the diode 47 and the transistor 42 is shorted, the transistor 41 is opened and the low frequency amplifier 36 is opened. Accordingly, depending on the open and close positions of the switch 46, the receive and transmit modes are set and the press-to-talk type speech between the sub-units is attained. When the sub-unit B is to be called, the call button 55' is depressed. Thus, the power supply 61 is activated and the power is supplied to the transmitter 50 and the potentiometer 99 of the call oscillator 54 is grounded through the diode 204. Also, the grounding of the potentiometer 97 adjusted to oscillate the frequency of 5.6 Hz is opened. The oscillator in the sub-unit A is adjusted to oscillate at 3.9 KHz. The 3.9 KHz signal emitted from the sub-unit is converted to the 800 Hz signal in the master unit and it is sent out to call the sub-unit B. When the call directed to the sub-unit A is to be transferred to the sub-unit B, the switch 45 is thrown to the position PT, the sub-unit B is called by the call button 55, and the press-to-talk type speech is made to tell the call from the external line. When the switch 45 in the sub-unit B is thrown to the talk (TK) position, the capacitor 214 starts to be charged. The charging current flows through the resistor 106 to negatively bias the base of the transistor 108 relative to the emitter. As a result, the power supply 61 is started and the power is supplied to the transmitters 50 and 51 through the diode 58. The power is supplied to the encoder 49 through the diode 212 and the charging current flows through the input capacitor 210 which together with a choke coil connected in parallel thereto produces a pulsive input signal. The encoder 49 is activated by the pulsive input to send out a predetermined signal. Thus, the signal is sent out for a short period. The charging current flows through the capacitor 207 and the transistor 203 is shorted by the charging current. As a result, the transistor 216 is opened and the oscillator 54 oscillates at the frequency (5.6 KHz) determined by the resistor 97. When the encoder 49 produces an output, it is sent to the master unit through the transmitter 50 as the 5.6 KHz on/off signal. Since the signal transmission period of the encoder 49 is one fourth or fifth of second, the time constant determined by the resistor 206 and the capacitor 207 may be approximately one second. When the call button 55 is depressed, the power supply 61 is also activated as described above, and the encoder 49 is also activated. In this case, since the oscillation frequency of the oscillator 54 is 4.7 KHz or 3.9 KH which is different from 5.6 KHz, the operation of the master unit is not disturbed. When the switch 45 is thrown to the talk (TK) position, the power is supplied to the capacitor 210, the encoder 49 and the capacitor 207 through the diode 208. Thus, the signal of the encoder is sent out for a short period as the 5.6 KHz on/off signal, as is done when the switch is thrown to the PT position. The master unit is set in the speech mode by this signal, as explained with reference to FIG. 18. When the dial signal generator 57 is manipulated in the same manner as a conventional telephone set in order to call the external line telephone set, the generator 57 normally generates a positive signal, the transistor 216 is shorted and the oscillator 54 stops to oscillate. In the signal transmission mode, the output of the generator 57 stops and the oscillator 54 oscillates. Accordingly, the 5.6 KHz signal is sent when the dialing is marked. The operation of the master unit after the signal has been received by the master unit is same as that explained in connection with FIG. 18. The telephone line is opened and closed in accordance with the dialing signal to call a desired station. The switches 55 and 55' are ganged. Normally, the switch 55' is open and the switch 55 is closed, and when depressed, the status is reversed.

Figure 20:
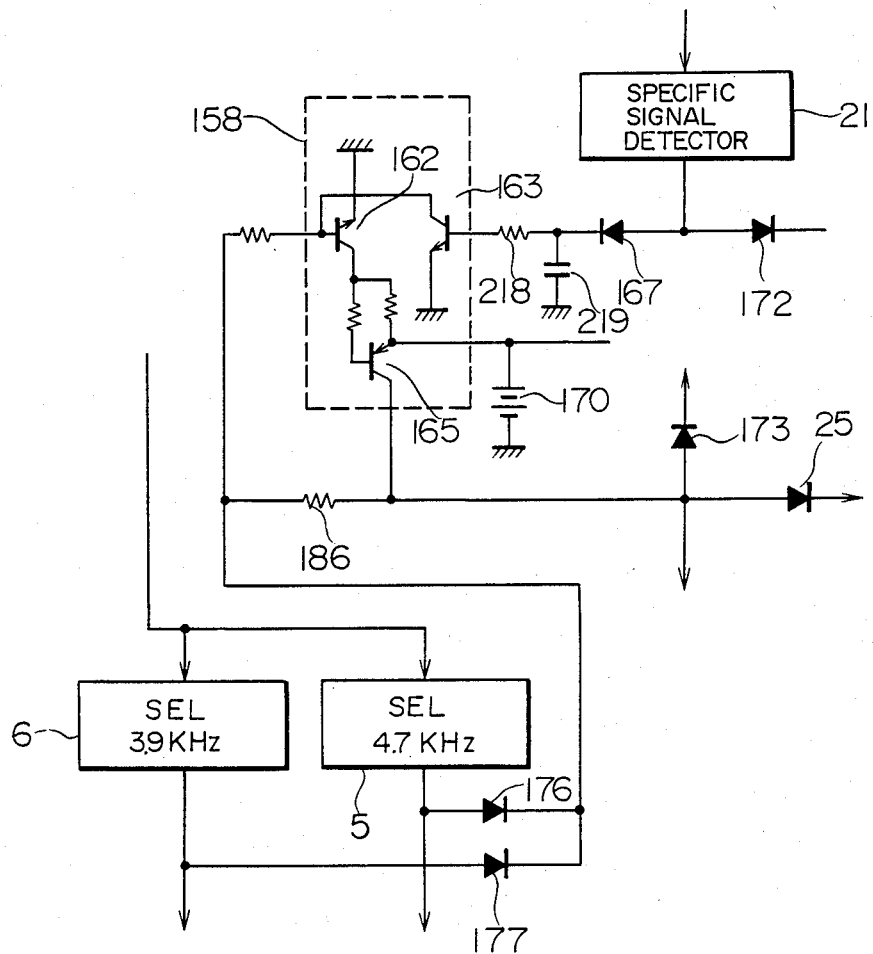
FIG. 20 shows a circuit diagram which is a partially modification of FIG. 18 in which a power supply which is self-held in the speech between the sub-units is reset when a predetermined signal indicating the end of speech is detected.

FIG. 20 shows other embodiment of the present invention. It shows a portion of FIG. 18 and the other portions are same as those of FIG. 18 and hence are omitted. In FIG. 18, in the speech between the sub-units, when both units are in the receive mode for a long period, it may exceed the time constant determined by the capacitor 160 and the resistor 161 and the power supply 158 may be reset. The speech between the sub-units may be restored by recalling but the hold of the external line cannot be restored after it has been released. In FIG. 20, such a problem is solved. The power supply 158 is activated only by the outputs of the signal selectors 5 and 6. Thereafter, it is self-held by the resistor 186. Accordingly, after it has been activated, it is not deactivated until the specific signal is received and the decoder 21 produces the output. When the end of speech between the sub-units is detected in the sub-unit, that is, when the switch 45 is thrown to the SBy or TK position, the power supply 158 is reset. In this manner, the above problem is solved.

As described above, in the cordless telephone system in which the press-to-talk type speech is attained between any two of a plurality of sub-units through the master unit, the timer of the controller for the press-to-talk type speech provided in the master unit is started and stopped by the specific signal sent from the sub-unit. Thus, even if the transmission by either unit does not take place for a long period during the speech between the sub-units, there is no trouble. When the speech terminates, the controller is reset in a short period to allow immediate speech with the external telephone line. As a result, the external telephone call can be quickly transferred from the sub-unit A to the sub-unit B without any special manipulation but with the same operation as that in the conventional telephone set.

Figure 21:
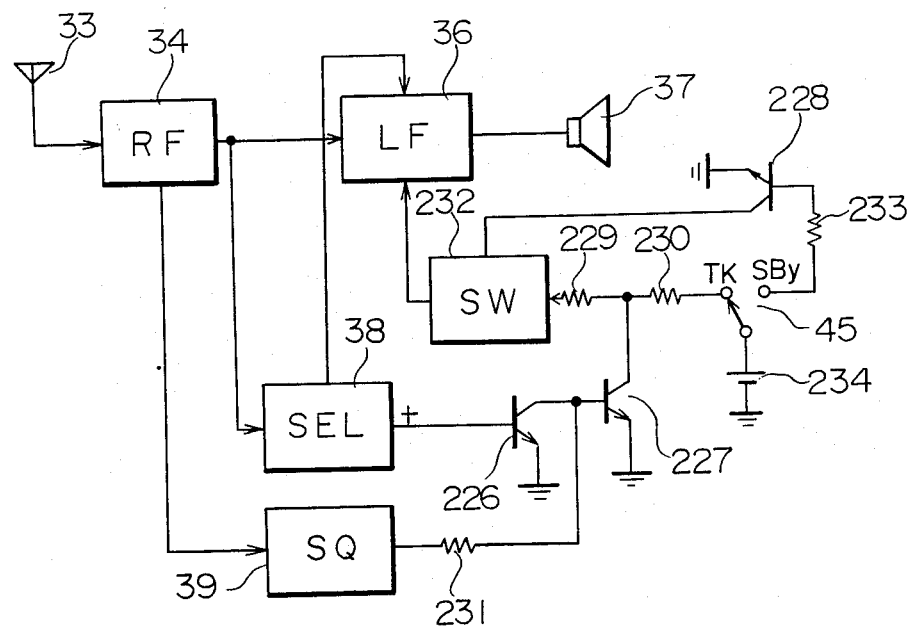
FIG. 21 shows a connection diagram of a sub-unit receiver in a ninth embodiment of the present invention in which the speech of a sub-unit is prevented from being intercepted by other sub-units.

FIG. 21 shows a ninth embodiment of the present invention. It shows a circuit diagram of a receiver of a sub-unit. The transmitter is omitted because it is not relevant to the explanation of the operation of the present embodiment. Detail of the power supply is also omitted. Numeral 33 denotes an antenna for transmission and reception, numeral 34 denotes an RF amplifier/detector of the receiver, numeral 36 denotes a low frequency amplifier, and numeral 37 denotes a speaker. Numeral 232 denotes a controller for activating and deactivating the low frequency amplifier 36, numeral 38 denotes a signal selector which produces an output in response to only a specific call signal, numeral 39 denotes a detector which produces an output in response to a received carrier, and numeral 45 denotes a switch for selecting a talk (TK) mode or a stand-by (SBy) mode. When the press-to-talk type speech between the sub-units is to be made, a press-to-talk contact (TK) is further necessary, although it is omitted. When the specific signal to call the sub-unit is sent from the master unit (not shown), the signal selector 38 produces an output, of which, a portion of an audio frequency component is applied to the low frequency amplifier 36. Thus, the call signal is amplified and supplied to the speaker 37 which informs one of the call. On the other hand, the output of the signal selector 38 shorts the transistor 226. The detector 39 produces an output in response to the carrier. Since the output is shorted by the transistor 226, the transistor 227 is opened. Under this condition, when the switch 45 is thrown to the talk position, the current from the power supply 234 is supplied to the controller 232 through the resistors 229 and 230. The controller 232 is activated by the input current to activate the low frequency amplifier 36. It continues the operation even after the control input current has been terminated and is reset to restore the initial open state of the amplifier 36 when the reset signal is received or the transistor 228 is shorted. In this manner, the sub-unit can speech with the external telephone line or other sub-unit through the master unit. Let us assume that sub-unit A is in the talk mode and the switch 45 in the sub-unit B is thrown to the talk (TK) position to receive the electromagnetic wave of the speech. Under this condition, since the specific call signal is not sent, the transistor 226 is opened. Since the transmission electromagnetic wave is emitted from the master unit during the speech, the detector 39 produces the output. As a result, the transistor 227 is shorted. Since the junction point of the resistors 229 and 230 is shorted, no control current flows to the controller 232. Thus, the low frequency amplifier 36 is not activated and the sub-unit B cannot intercept the speech of the sub-unit A.

When the sub-unit A is to call the external telephone line or the sub-unit B through the master unit for speech, the switch 45 is thrown to the talk (TK) position. In this case, since neither the call signal nor the carrier electromagnetic wave is present, the transistor 227 is open and the current from the power supply 234 flows into the controller 232 so that the amplifier 36 is activated and the receive mode is set. The master unit is then activated by means not shown to call the external telephone line or the sub-unit B. As the master unit is activated, the electromagnetic wave is emitted and the detector 39 produces the output. Thus, the transistor 227 is shorted and the control voltage to the controller 232 is stopped. As explained above, the controller 232 is activated by the control current, and once it is activated, it continues to operate and stops the operation in response to only the reset signal. Accordingly, there is no trouble in the call operation or speech of the sub-unit A.

Figure 22:
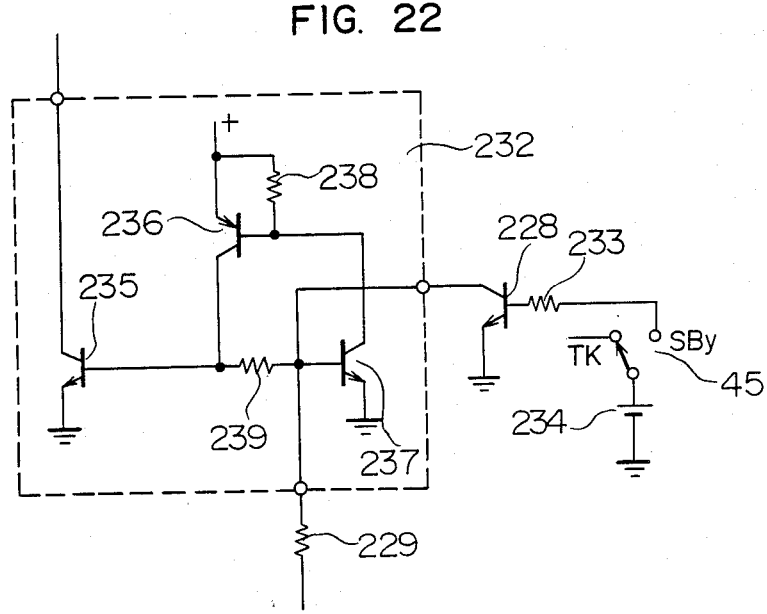
FIG. 22 shows an embodiment of a controller for the sub-unit receiver.

The controller 232 which is activated only by the control input, and once activated, continues to operate even after the activation input terminates, and is reset only by the stop input signal, may be one of known means. One example is shown in FIG. 22. When a current flows into the base of the transistor 237 through the resistor 229, the collector circuit is shorted and the base voltage of the transistor 236 drops so that the base is negative relative to the emitter. Thus, a current flows into the collector circuit and a portion thereof is applied to the base of the transistor 237 through the resistor 239. As a result, the circuit continues to self-hold even after the current flowing through the resistor 229 has terminated. This output shorts the transistor 235 to keep the low frequency amplifier 36 activated. When the switch 45 is thrown from the talk (TK) position to the stand-by (SBy) position, the transistor 228 is shorted and the base current of the transistor 237 terminates and the collector thereof is opened. As a result, the base and emitter of the transistor 236 are at the same potential and no collector current flows. Thus, the self-hold operation is reset and the circuit does not operate until a current is applied through the resistor 229. In this manner, the object of the controller 232 used in the present embodiment is attained. In the press-to-talk type speech, the switch 45 should be a three-position switch as shown in the embodiment of FIG. 21. The control method for the controller 232 is same as that for the talk (T) mode. As described above, in the present embodiment which is the cordless telephone system having a master unit connected to the telephone line and having the radio transceiver and a plurality of sub-units each having the radio transceiver corresponding to the master unit and being capable of transmitting and receiving the speech to and from the telephone line through the telephone line, each of the sub-units is provided with means for enabling the reception of the speech by the specific call signal from the master unit or other sub-unit, means for disabling the reception of the speech by the output of the received electromagnetic wave, and means for enabling the reception of the speech by the speech switch or press-to-talk switch, so that the speech between the master unit and the sub-unit is prevented from being intercepted by other sub-unit.

Figure 23:
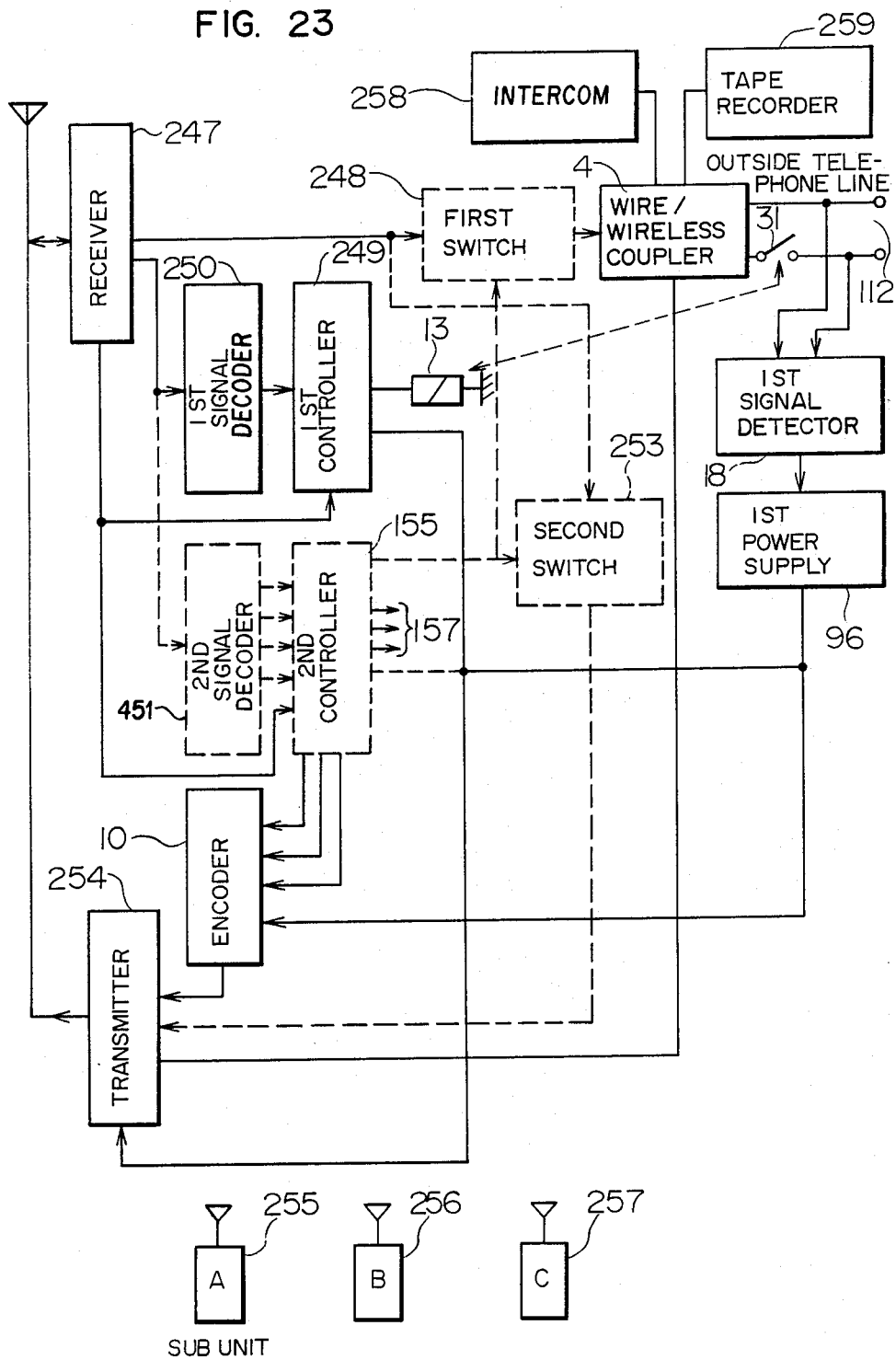
FIG. 23 shows a block diagram of a summary of the respective embodiments.

In conclusion an explanation is made with reference to FIG. 23 showing a block diagram of the master unit. It is a general view which summarizes the embodiments described hereinabove. The dashed lines indicate arrangements representing novel and typical portions of the embodiments. Needless to say the Figure is shown for convenience of explanation and this invention should not be limited to only them. Numeral 247 denotes a receiver which corresponds to 1, 2 and 3 in FIG. 1. Numeral 96 denotes a first power supply which corresponds to 15, 16 and 17 in FIG. 1. Numeral 249 denotes a first controller which controls a transmitter 254 and opens or closes the external telephone line by a contact 31 of a relay 13. It has functions of the controller 11 activated by the SQ output, shown in FIG. 1, the transistor circuit 12 for activating the relay 13 shown in FIG. 3, and the self-hold circuit 22 and the power supply 23 shown in FIG. 8. Numeral 250 denotes a first signal decoder which has functions of the signal selector 8 shown in FIG. 1, and the specific signal detector 21 for detecting the specific code signal shown in FIG. 8. Numeral 451 denotes a second signal decoder which corresponds to 5, 6 and 7 in FIG. 1 and 21 in FIGS. 3, 4 and 6. Numeral 155 denotes a second controller which produces an output to control the equipments other than the relay in accordance with the input signal. It corresponds to 22, 23 and 24 of FIG. 1; 9, 21, 22 and 23 of FIG. 4; 21 and 139 of FIG. 6; 155 of FIG. 12; and 158 of FIG. 20. FIG. 3 shows the simplest embodiment. In FIG. 8, the transistors 117 and 119 are used as the simplest example. FIG. 12 shows the multi-purpose controller 155, FIG. 17 shows 391, 392, 393 and 394, and FIGS. 18 and 20 show 158. Numeral 248 denotes a first switch which is an auxiliary circuit for the transfer or speech between the sub-units. It is provided to block the signal path between the receiver 247 and the wire/wireless coupler 4 to prevent the speech tone from being leaked to the external telephone line. It corresponds to the transistor 117 in FIGS. 6, 8 and 18. Numeral 253 denotes a second switch which is an auxiliary circuit for the transfer and speech between the sub-units. It corresponds to 89, 90 and 91–94 in FIG. 4 and the transistor 94 in FIGS. 6, 8 and 18. Numeral 10 denotes an encoder which produces the call signal in response to the outputs of 96 and 155. It corresponds to the transistor 62 and the associated circuit of FIG. 3, and corresponds to 10 in FIGS. 10A and B. Numeral 254 denotes a transmitter which corresponds to 28, 29 and 30 in FIG. 22. Numerals 255, 256 and 257 denote sub-units A, B and C, respectively. Numeral 258 denotes an intercom and numeral 259 denotes a tape recorder used to automatically respond and record.

When a signal to activate the first signal decoder is transmitted from the sub-unit, the first controller and the relay 13 are activated and the contact 31 of the relay 13 is closed. As a result, the external telephone line 112 is connected and the power is supplied from the first controller to the transmitter 254 so that the master unit and the sub-unit can make speech. When a call is made from the external telephone line, the first signal detector 18 and the first power supply 96 are activated to activate the transmitter 254 and the encoder 10 to transmit the signal for calling the sub-unit. As the called sub-unit handles the speech operation, the sub-unit can make the speech with the external telephone line through the master unit. The above is the outline of the conventional cordless telephone system. What is provided by the present invention is described below.

If the speech between the sub-units is to be made when they are not connected to the external telephone line, for example when the sub-unit B is to be called by the sub-unit A, the signal for activating the second signal decoder 451 of the master unit is sent. Thus, the second controller 155 of the master unit is activated, the transmitter 254 is activated and the encoder 10 is activated to transmit the signal for calling the sub-unit B so that the sub-unit B is called. The second controller 155 closes the second switch 253 so that the received speech can be transferred to the transmitter 254. Thus, by making the speech operation in the sub-unit B, the press-to-talk type speech is attained between the sub-units A and B.

The transfer operation of the call from the external telephone line directed to the sub-unit A to the sub-unit B is explained. When the signal for calling the sub-unit B is sent from the sub-unit A, the second controller 155 is activated by the signal to activate the transmitter 254 and the encoder 10. The output of the receiver 247 is applied to the transmitter 254 by the second switch 253 so that the speech can be transmitted from the sub-unit A to the sub-unit B. On the other hand, the first switch 248 is activated to prevent the output of the receiver 247 from leaking to the external telephone line. As the sub-unit B handles the speech operation after the notice of transfer has been received, the sub-unit B can make the speech with the external telephone line. It is necessary to reset the switches 248 and 253 as described hereinabove.

The tape recorder 259 is provided to record the speech in the absence so that it may be reproduced later in the sub-unit. The switching of record, reproduce, start and stop modes and the connection to the receiver 247 and the transmitter 254 are easily attained by known technique by applying various signals to the second controller and using the outputs developed at the output terminals 157.

The speech can be made between the intercom 258 and the sub-unit, as explained in detail hereinabove. Numerals 255, 256 and 257 denote sub-units for the master unit, the detail of which was explained hereinabove.

I claim:

1. A cordless telephone system comprising:
   a master unit connected to a telephone line and having a radio transceiver;
   at least one sub-unit having a radio transceiver and which is capable of transmitting and receiving speech to and from the telephone line through the master unit; and
   control means responsive to a control signal from said sub-unit, said control means including at least one of: transfer control means for permitting transfer of speech on said telephone line from one sub-unit to another sub-unit, speech control means for permitting speech between sub-units through the master unit, and equipment control means for controlling equipment other than the telephone line by said sub-unit.

2. A cordless telephone system adapted to provide two-way communication between a master unit and plural sub-units, comprising:
   a coupling unit;
   a radio unit including a normally-on master unit receiver and an normal-off master unit transmitter coupled to said coupling unit;
   means for connecting said coupling unit to an external telephone line;
   a first detector for detecting a calling signal on said telephone line;
   means for connecting said telephone line to said first detector, said first detector actuating a first power supply unit in response to said calling signal from said telephone line;
   means for connecting said first power supply unit to an encoder unit which receives operative power from said first power supply unit and produces an output signal according to an input signal applied thereto;
   means for connecting said encoder to said transmitter;
   means for supplying a DC working power output from said first power supply unit to said transmitter;
   a first signal decoder for receiving and decoding a predetermined signal transmitted from one of said sub-units;
   means for connecting said first signal decoder to a first control unit which actuates a line relay for making and breaking said telephone line by its contacts and which supplies DC working power to said transmitter;
   a second signal decoder;
   means for connecting said second signal decoder to a second control unit which provides DC working power to said transmitter and a control signal to said encoder unit;
   means for connecting said master unit receiver to said second control unit; and,
   means for connecting said second control unit to said encoder whereby, when a sub-unit A sends a predetermined signal to said master unit, said predetermined signal actuates said second signal decoder and sequentially said second control unit and said encoder to cause a calling signal for a sub-unit B to be transmitted from said transmitter, enabling said sub-unit A to call said sub-unit B.

3. A system as claimed in claim 2 further comprising:
   a second switching means for connecting an output of said receiver to an input of said transmitter, said second switching means being controlled by said second control unit and permitting an output signal of said receiver to pass to an input of said transmitter, according to a signal applied to said second signal decoder, whereby said sub-unit A sends a signal to said master unit, said second signal decoder is actuated, and then said second control unit is actuated, and said line relay is not actuated, because there if no signal received and decoded by said first decoder, enabling a press-to-talk communication to be carried on between sub-units independently of said telephone line.

4. A system as claimed in above claim 2, wherein said first control unit starts to operate by a predetermined starting signal, said first control unit having a self-hold function and being reset by a predetermined reset signal.

5. A system as claimed in above claim 2, wherein said second control unit starts to operate by a predetermined starting signal and has a self-hold function and is reset by a predetermined reset signal.

6. A system as claimed in claim 1 further comprising a tape recorder having the functions of automatic telephone answering and recording and reproducing and wherein said equipment includes switching means for connecting an output of said tape recorder to a modulator input terminal of said transceiver and said equipment control means includes means for enabling said switching means in response to a predetermined signal sent from said sub-unit.

7. A system as claimed in claim 1 further comprising at least one intercom unit connected to said master unit, and wherein said equipment includes means for connecting said sub-unit and said intercom unit through said master unit and said equipment control means includes means for enabling said connecting means in response to a predetermined signal sent from said sub-unit.

8. A system as claimed in claim 2, wherein said second signal decoder includes a rectifier for a carrier signal which provides a switching signal from said carrier signal.

9. A system as claimed in claim 2, wherein said second signal decoder includes a resonant circuit.

10. A system as claimed in claim 2, wherein said second signal decoder includes an electromagnetically vibrating member.

11. A system as claimed in claim 2, wherein said second signal decoder includes a detector for a pulse code signal.

12. A system as claimed in claim 2, wherein said second signal decoder includes a detector for a phase shift signal.

13. A system as claimed in claim 2, wherein said second signal decoder includes a multichannel decoder.

14. A system as claimed in claim 2, further including a first switching unit which is controlled by said second control unit, means for connecting said first switching unit between an output terminal of said receiver and an input terminal of said coupler, a second switching unit which is controlled by said second control unit, and means for connecting said second switching unit between an output terminal of said receiver and an input terminal of said transmitter;
whereby said first switching unit is normally closed and said second switching unit is normally open respectively according to the operation to the operation of said second control unit.

15. A system as claimed in claim 16, wherein said reset signal is a normal carrier signal.

16. A system as claimed in claim 5, wherein said reset signal is a normal carrier signal.

17. A system as claimed in claim 2, wherein said first control unit has a delay function.

18. A system as claimed in claim 2, wherein said first control unit has a self-hold function.

19. A system as claimed in claim 2, wherein said second control unit has a delay function.

20. A system as claimed in claim 2, wherein said second control unit has a self-hold function.

21. A system as claimed in claim 2, further including means for connecting said second control unit to an external control apparatus which includes switching means operated by an output of said second control unit.

22. A cordless telephone system adapted for providing two-way communication between a master unit and plural sub-units, comprising:
a matching unit, and a radio unit including a normally-on master unit receiver and a normally-off master unit transmitter coupled to said matching unit;
means for connecting said matching unit to an external telephone line;
a first detector for detecting a calling signal on said telephone line;
means for connecting said telephone line to said first detector, said first detector actuating a first power supply unit in response to said calling signal on said telephone line;
means for connecting said first power supply unit to an encoder unit which produces an output signal according to a signal applied from said first power supply unit and which supplies said output signal to said transmitter;
means for supplying a DC working power output from said first power supply unit to said transmitter;
a first signal decoder for receiving and decoding a predetermined signal transmitted from a sub-unit;
means for connecting said first signal decoder to a first control unit which actuates a line relay for making and breaking said telephone line by its contacts and which supplies DC working power to said transmitter;
a second signal decoder; and
means for connecting said receiver to said second decoder, said second signal decoder supplying a signal output to a second control unit which makes said second control unit send a signal to said transmitter, said second control unit providing DC working power to said transmitter and activation said line relay;
said second control unit further including means for initiating operation of said second control unit by a predetermined starting signal and for resetting by a predetermined reset signal, whereby a sub-unit A can hold said relay in an off-hook position by sending a predetermined starting signal and then call up a sub-unit B for transferring a call on said external telephone line, so that said sub-unit B handles said call and communicates with said external telephone line.

* * * * *

UNITED STATES PATENT AND TRADEMARK OFFICE
CERTIFICATE OF CORRECTION

PATENT NO. : 4,882,746

DATED : November 21, 1989

INVENTOR(S) : Masatoshi Shimada

It is certified that error appears in the above-identified patent and that said Letters Patent is hereby corrected as shown below:

On the cover page, under Item "[30] Foreign Application Priority Data" change the first entry from "Mar. 22, 1987 [JP] Japan..............62-68772"

to

--Mar. 25, 1987 [JP] Japan.............62-68772--.

Signed and Sealed this

Sixth Day of August, 1991

Attest:

HARRY F. MANBECK, JR.

Attesting Officer

Commissioner of Patents and Trademarks